US012759668B2

(12) United States Patent
Schroeder

(10) Patent No.: US 12,759,668 B2
(45) Date of Patent: Oct. 13, 2026

(54) ELECTRICALLY-POWERED SNOWMOBILE

(71) Applicant: TAIGA MOTORS INC., Lasalle (CA)

(72) Inventor: Matthew Schroeder, Montreal (CA)

(73) Assignee: TAIGA MOTORS INC., Lasalle (CA)

( * ) Notice: Subject to any disclaimer, the term of this patent is extended or adjusted under 35 U.S.C. 154(b) by 393 days.

(21) Appl. No.: 18/500,464

(22) Filed: Nov. 2, 2023

(65) Prior Publication Data

US 2024/0149977 A1 May 9, 2024

Related U.S. Application Data

(60) Provisional application No. 63/422,617, filed on Nov. 4, 2022.

(51) Int. Cl.
*B62M 27/02* (2006.01)
*B60K 1/04* (2019.01)

(52) U.S. Cl.
CPC ............... *B62M 27/02* (2013.01); *B60K 1/04* (2013.01); *B62M 2027/027* (2013.01)

(58) Field of Classification Search
CPC ........................ B62M 2027/023; B62M 27/02
See application file for complete search history.

(56) References Cited

U.S. PATENT DOCUMENTS 5,533,586 A 7/1996 Thompson
5,992,552 A * 11/1999 Eto ........................ B62M 27/00 180/312
6,070,683 A * 6/2000 Izumi ..................... B62M 27/02 180/9.62
12,187,382 B2 * 1/2025 Thompson ............. B62M 27/02
12,252,212 B2 * 3/2025 Vaisanen ................. B60L 50/60
12,300,839 B2 * 5/2025 Connors .................. B60K 1/00
2012/0178561 A1 * 7/2012 Lafreniere .............. F16H 55/56 474/28
2020/0140037 A1 * 5/2020 Haavikko .............. B62D 55/07
2022/0017181 A1 * 1/2022 Suzuki .................... B60L 50/66
2022/0411018 A1 12/2022 Vaisanen
2024/0067303 A1 * 2/2024 Schroeder ............ H02K 1/2766
2024/0182135 A1 * 6/2024 Morfino ................. B62M 29/00
2025/0010945 A1 * 1/2025 Leboeuf ................. B62M 11/14

FOREIGN PATENT DOCUMENTS

WO 2018215693 A1 11/2018
WO 2021084520 A2 10/2020

* cited by examiner

*Primary Examiner* — Minnah L Seoh
*Assistant Examiner* — Hosam Shabara
(74) *Attorney, Agent, or Firm* — Norton Rose Fulbright Canada LLP

(57) ABSTRACT

Architectures of electrically-powered snowmobiles are provided. A snowmobile includes a body extending along a longitudinal axis between a front end and a rear end, a battery pack mounted to the body and enclosing a plurality of battery modules, and an electric motor assembly mounted to the body. The electric motor assembly includes an electric motor configured to receive electrical energy from the plurality of battery modules. At least part of the electric motor assembly is positioned forwardly of the battery pack.

19 Claims, 8 Drawing Sheets

ELECTRICALLY-POWERED SNOWMOBILE

CROSS REFERENCE TO RELATED APPLICATION AND CLAIM OF PRIORITY

The present application claims priority to U.S. provisional patent application No. 63/422,617 filed on Nov. 4, 2022, the entire contents of which are hereby incorporated herein by reference.

TECHNICAL FIELD

The application relates generally to snowmobiles and, more particularly, to electrically-powered snowmobiles.

BACKGROUND

Some snowmobiles combust fuel in an internal-combustion engine. The architecture of such fuel-consuming snowmobiles is designed to accommodate the size, weight and loads generated by the internal-combustion engine during operation of the snowmobile. The architecture of such fuel-consuming snowmobiles is also designed to accommodate the evacuation of hot combustion gases, cooling of components, and the lubrication of still other components.

For snowmobiles having batteries which supply electrical power to one or more electric motors, the architecture of the snowmobile may be different than that of fuel-consuming snowmobiles.

SUMMARY

In one aspect, the disclosure describes a snowmobile comprising:

- a body extending along a longitudinal axis between a front end and a rear end;
- a battery pack mounted to the body and enclosing a plurality of battery modules; and
- an electric motor assembly mounted to the body, the electric motor assembly including an electric motor configured to receive electrical energy from the plurality of battery modules, at least part of the electric motor assembly positioned forwardly of the battery pack.

A forwardmost battery module of the plurality of battery modules may be disposed closer to the front end than all other battery modules of the plurality of battery modules. In some embodiments, at least part of the electric motor assembly may be positioned forwardly of the forwardmost battery module.

The body may include an overstructure disposed at least partly above the plurality of battery modules.

The electric motor may have a motor output positioned forwardly of the battery pack.

The electric motor assembly may include a motor casing positioned forwardly of the battery pack.

The body may include a rear tunnel and a front sub-frame disposed closer to the front end than the rear tunnel. In some embodiments, at least part of the electric motor assembly may be positioned vertically above an upper surface of the rear tunnel.

The electric motor assembly may be supported by the front sub-frame.

The body may define a center plane being upright and containing the longitudinal axis. The electric motor may be aligned with the center plane within the front sub-frame.

The snowmobile may comprise a front suspension pivotably connected to the front sub-frame. The body may include an overstructure at least partially mounted to the front sub-frame.

The electric motor assembly may include a motor casing being cylindrical. An upper portion of the motor casing may be positioned vertically above the upper surface of the rear tunnel.

Embodiments may include combinations of the above features.

In another aspect, the disclosure describes a snowmobile comprising:

- a body extending along a longitudinal axis between a front end and a rear end, the body including a rear tunnel and a front sub-frame disposed closer to the front end than the rear tunnel, the front sub-frame supporting a front suspension and at least partially delimiting an inner cavity; and
- an electric motor assembly mounted to the front sub-frame and disposed in the inner cavity.

The front sub-frame may include a motor support mounted to the electric motor assembly.

The electric motor assembly may include a motor casing mounted to the motor support.

The body may include a drive belt case mounted between the front sub-frame and the rear tunnel.

The front sub-frame may be mounted to the rear tunnel.

In some embodiments, at least part of the electric motor assembly may be positioned vertically above an upper surface of the tunnel.

The body may include an overstructure. The front sub-frame may at least partially support the overstructure.

The snowmobile may comprise a steering column. The overstructure may support the steering column.

Embodiments may include combinations of the above features.

In another aspect, the disclosure describes a snowmobile comprising:

- a body extending along a longitudinal axis between a front end and a rear end, the body defining a center plane being upright and containing the longitudinal axis;
- a battery pack mounted to the body and enclosing a plurality of battery modules;
- an electric motor assembly mounted to the body, the electric motor assembly including an electric motor configured to receive electrical energy from the plurality of battery modules; and
- a front suspension at the front end of the body, the front suspension comprising:
- a plurality of lower suspension members pivotably mounted to the body and disposed on opposite sides of the center plane; and
- a plurality of upper suspension members pivotably mounted to the body and disposed on opposite sides of the center plane, the plurality of upper suspension members positioned above the plurality of lower suspension members; and
- each lower suspension member of the plurality of lower suspension members having an aft pickup and a forward pickup, the aft pickups of the plurality of lower suspension members positioned vertically lower than the electric motor assembly.

The aft pickups and the forward pickups of the plurality of lower suspension members may be spaced laterally from the center plane.

The aft pickups of the plurality of lower suspension members may be spaced laterally further from the center plane than the forward pickups of the plurality of lower suspension members.

The electric motor assembly may include a motor output of the motor and a motor casing enclosing the motor. The aft pickups of the plurality of lower suspension members may be positioned lower than the motor output.

The aft pickups of the plurality of lower suspension members may be positioned lower than the motor casing.

The forward pickups of the plurality of lower suspension members may be positioned beneath the motor output.

In some embodiments, each upper suspension member of the plurality of upper suspension members may have an aft pickup and a forward pickup. The forward pickups of the plurality of upper suspension members may be spaced laterally further from the center plane than the forward pickups of the plurality of lower suspension members.

The aft pickups of the plurality of upper suspension members may be spaced laterally further from the center plane than the aft pickups of the plurality of lower suspension members.

The aft pickups of the plurality of upper suspension members may be positioned lower than a motor output of the electric motor.

The forward pickups of the plurality of upper suspension members may be positioned forwardly of the electric motor assembly.

In some embodiments, each upper suspension member may be pivotably mounted to the body at the aft pickup and at the forward pickup of each upper suspension member. An upper pivot axis may extend between the aft pickup and the forward pickup of each upper suspension member.

In some embodiments, each lower suspension member may be pivotably mounted to the body at the aft pickup and at the forward pickup of each lower suspension member. A lower pivot axis may extend between the aft pickup and the forward pickup of each lower suspension member.

The upper pivot axis and the lower pivot axis may be projected onto a horizontal plane. The upper pivot axis may be transverse to the lower pivot axis in the horizontal plane.

The upper pivot axis and the lower pivot axis may be transverse to the longitudinal axis.

A first upper suspension member of the plurality of upper suspension members may be positioned on one side of the center plane and may define a first upper pivot axis. A second upper suspension member of the plurality of upper suspension members may be positioned on the other side of the center plane and may define a second upper pivot axis transverse to the first upper pivot axis.

A first lower suspension member of the plurality of lower suspension members may be positioned on one side of the center plane and may define a first lower pivot axis. A second lower suspension member of the plurality of lower suspension members may be positioned on the other side of the center plane and may define a second lower pivot axis transverse to the first lower pivot axis.

The forward pickups of the plurality of lower suspension members may be positioned forwardly of the electric motor assembly.

The plurality of lower suspension members and the plurality of upper suspension members may be positioned forwardly of the battery pack.

In some embodiments, each lower suspension member of the plurality of lower suspension members and each upper suspension member the plurality of upper suspension members may be a wishbone suspension member.

Embodiments may include combinations of the above features.

In another aspect, the disclosure describes a snowmobile comprising:

- a body extending along a longitudinal axis between a front end and a rear end, the body defining a center plane being upright and containing the center axis;
- a battery pack mounted to the body and enclosing a plurality of battery modules; and
- an electric motor assembly mounted to the body, the electric motor assembly including an electric motor configured to receive electrical energy from the plurality of battery modules, the electric motor positioned along the longitudinal axis.

The electric motor may be laterally along the center plane.

The electric motor assembly may include a motor casing enclosing the electric motor. The center plane may extend through the motor casing.

The electric motor may include a motor output having an orientation transverse to the center plane.

The motor output may be disposed on only one side of the center plane.

The plurality of battery modules may include two forwardmost battery modules disposed closer to the front end than all other battery modules of the plurality of battery modules. In some embodiments, each forwardmost battery module of the two forwardmost battery modules may be disposed on opposite sides of the center plane.

The center plane may extend through the all other battery modules of the plurality of battery modules.

The body may include a front sub-frame at the front end. The electric motor may be mounted within an internal cavity of the front sub-frame.

The electric motor may be mounted to a motor support within the front sub-frame.

The electric motor may be soft-mounted to the motor support.

The electric motor may be configured to drive a jackshaft, which in turn may be configured to drive a drive belt.

Embodiments may include combinations of the above features.

In another aspect, the disclosure describes a snowmobile comprising:

- a body extending along a longitudinal axis between a front end and a rear end;
- a battery pack mounted to the body and enclosing a plurality of battery modules;
- an electric motor assembly mounted to the body, the electric motor assembly including an electric motor configured to receive electrical energy from the plurality of battery modules to drive a motor output of the electric motor; and
- a transmission, comprising:
- a transmission shaft extending along a transmission shaft axis between a first end drivingly coupled to the motor output and a second end; and
- a drive wheel drivingly coupled to the second end of the transmission shaft.

An output speed at the second end of the transmission shaft axis may be substantially equivalent to an input speed at the first end of the transmission shaft axis.

An output speed at the second end of the transmission shaft axis may differ from an input speed at the first end of the transmission shaft axis.

The body may define a center plane being upright and containing the longitudinal axis. The transmission shaft axis may be transverse to the center plane.

The motor output, the transmission shaft and the drive wheel may be disposed on only one side of the center plane.

The drive wheel may transmit torque to a drive belt. The drive belt may be in communication with a drive track wheel.

The transmission shaft may be supported at the first end by a first bearing and at the second end by a second bearing.

The electric motor assembly may include a motor casing enclosing the electric motor. The motor casing may be mounted to the body. One of the body and the motor casing may include the first bearing.

The body may include a drive belt case. The drive belt case may include the second bearing.

The transmission shaft may be hard-mounted to the body via the first and second bearings, and the electric motor may be soft-mounted to the body via one or more dampers.

The drive belt case may at least partially enclose the drive wheel and the drive track wheel.

The snowmobile may comprise at least one brake actionable against the transmission shaft at a location between the first end and the second end.

The motor output may include a female spline and the first end of the transmission shaft may include a male spline.

The transmission shaft axis may be collinear with a motor output axis.

Embodiments may include combinations of the above features.

In another aspect, the disclosure describes an electric vehicle comprising:

a body extending along a longitudinal axis between a front end and a rear end;

a battery pack mounted to the body and enclosing a plurality of battery modules;

an electric motor assembly mounted to the body, the electric motor assembly including an electric motor configured to receive electrical energy from the plurality of battery modules to drive a motor output of the electric motor, the electric motor being soft-mounted to the body; and a transmission, comprising:

a transmission shaft extending along a transmission shaft axis between a first end drivingly coupled to the motor output and a second end, wherein the transmission shaft axis is co-axial with a motor output axis.

The motor output may include a female spline and the first end of the transmission shaft includes a male spline.

The body may define a center plane being upright and containing the longitudinal axis. The transmission shaft axis may be transverse to the center plane.

The transmission shaft may be supported at the first end by a first bearing and at the second end by a second bearing.

The electric motor assembly may include a motor casing enclosing the electric motor. The motor casing may be mounted to the body. One of the body and the motor casing may include the first bearing.

The body may include a drive belt case. The drive belt case may include the second bearing.

Embodiments may include combinations of the above features.

In another aspect, the disclosure describes a snowmobile comprising:

a body extending along a longitudinal axis between a front end and a rear end, the body defining a center plane being upright and containing the longitudinal axis;

a battery pack mounted to the body and enclosing a plurality of battery modules;

an electric motor assembly mounted to the body, the electric motor assembly including an electric motor configured to receive electrical energy from the plurality of battery modules; and a front suspension at the front end of the body, the front suspension comprising:

a plurality of lower suspension members pivotably mounted to the body and disposed on opposite sides of the center plane; and a plurality of upper suspension members pivotably mounted to the body and disposed on opposite sides of the center plane, the plurality of upper suspension members positioned above the plurality of lower suspension members; and each lower suspension member of the plurality of lower suspension members having an aft pickup and a forward pickup, wherein the aft pickups of the plurality of lower suspension members are positioned longitudinally rearward of at least a portion of the electric motor assembly.

In some embodiments, each upper suspension member of the plurality of upper suspension members may have an aft pickup and a forward pickup. The aft pickups of the plurality of upper suspension members may be positioned longitudinally rearward of at least a portion of the electric motor assembly.

The aft pickups of the plurality of lower suspension members may be positioned longitudinally rearward of an output of the electric motor.

The aft pickups of the plurality of upper suspension members may be positioned longitudinally rearward of an output of the electric motor.

The aft pickups of the plurality of lower suspension members may be positioned vertically lower than the electric motor assembly.

The aft pickups and the forward pickups of the plurality of lower suspension members may be spaced laterally from the center plane.

The aft pickups of the plurality of lower suspension members may be spaced laterally further from the center plane than the forward pickups of the plurality of lower suspension members.

The electric motor assembly may include a motor output of the motor and a motor casing enclosing the motor. The aft pickups of the plurality of lower suspension members may be positioned lower than the motor output.

The aft pickups of the plurality of lower suspension members may be positioned lower than the motor casing.

The forward pickups of the plurality of lower suspension members may be positioned vertically beneath the motor output.

The forward pickups of the plurality of upper suspension members may be spaced laterally further from the center plane than the forward pickups of the plurality of lower suspension members.

The aft pickups of the plurality of upper suspension members may be spaced laterally further from the center plane than the forward pickups of the plurality of lower suspension members.

The aft pickups of the plurality of upper suspension members may be positioned lower than a motor output of the electric motor.

The forward pickups of the plurality of upper suspension members may be positioned forwardly of the electric motor assembly.

In some embodiments, each upper suspension member may be pivotably mounted to the body at the aft pickup and at the forward pickup of each upper suspension member. An upper pivot axis may extend between the aft pickup and the forward pickup of each upper suspension member.

In some embodiments, each lower suspension member may be pivotably mounted to the body at the aft pickup and at the forward pickup of each lower suspension member. A lower pivot axis may extend between the aft pickup and the forward pickup of each lower suspension member.

The upper pivot axis and the lower pivot axis may be projected onto a horizontal plane. The upper pivot axis may be transverse to the lower pivot axis in the horizontal plane.

The upper pivot axis and the lower pivot axis may be transverse to the longitudinal axis.

A first upper suspension member of the plurality of upper suspension members may be positioned on one side of the center plane and may define a first upper pivot axis. A second upper suspension member of the plurality of upper suspension members may be positioned on the other side of the center plane and may define a second upper pivot axis transverse to the first upper pivot axis. A first lower suspension member of the plurality of lower suspension members may be positioned on one side of the center plane and may define a first lower pivot axis. A second lower suspension member of the plurality of lower suspension members may be positioned on the other side of the center plane and may define a second lower pivot axis transverse to the first lower pivot axis.

The plurality of lower suspension members and the plurality of upper suspension members may be positioned forwardly of the battery pack.

The forward pickups of the plurality of lower suspension members may be positioned forwardly of the electric motor assembly.

In some embodiments, each lower suspension member of the plurality of lower suspension members and each upper suspension member the plurality of upper suspension members may be a wishbone suspension member.

Embodiments may include combinations of the above features.

Further details of these and other aspects of the subject matter of this application will be apparent from the detailed description included below and the drawings.

DESCRIPTION OF THE DRAWINGS

Reference is now made to the accompanying figures in which.

DETAILED DESCRIPTION

The following disclosure relates to straddle seat vehicles and associated methods for operating the straddle seat vehicles. The straddle seat vehicles may include one or more electric motors for effecting propulsion of the vehicles in both forward and reverse directions. In some embodiments, the straddle seat vehicles and methods described herein may be applicable to electric powersport vehicles that may be operated off-road and/or in relatively rugged environments. Examples of suitable off-road electric and non-electric powersport vehicles include snowmobiles, all-terrain vehicles (ATVs), and utility task vehicles (UTVs), such as side-by-sides. As used herein, the term off-road vehicle refers to vehicles to which at least some regulations, requirements or laws applicable to on-road vehicles do not apply. In some embodiments, the vehicles and methods described herein may, based on one or more positions of an input device operatively connected to an electric motor, determine the forward direction and reverse direction of propulsion for the vehicle.

The terms “connected”, “connects” and “coupled to” may include both direct connection and coupling (in which two elements contact each other) and indirect connection and coupling (in which at least one additional element is located between the two elements).

Figure 1:
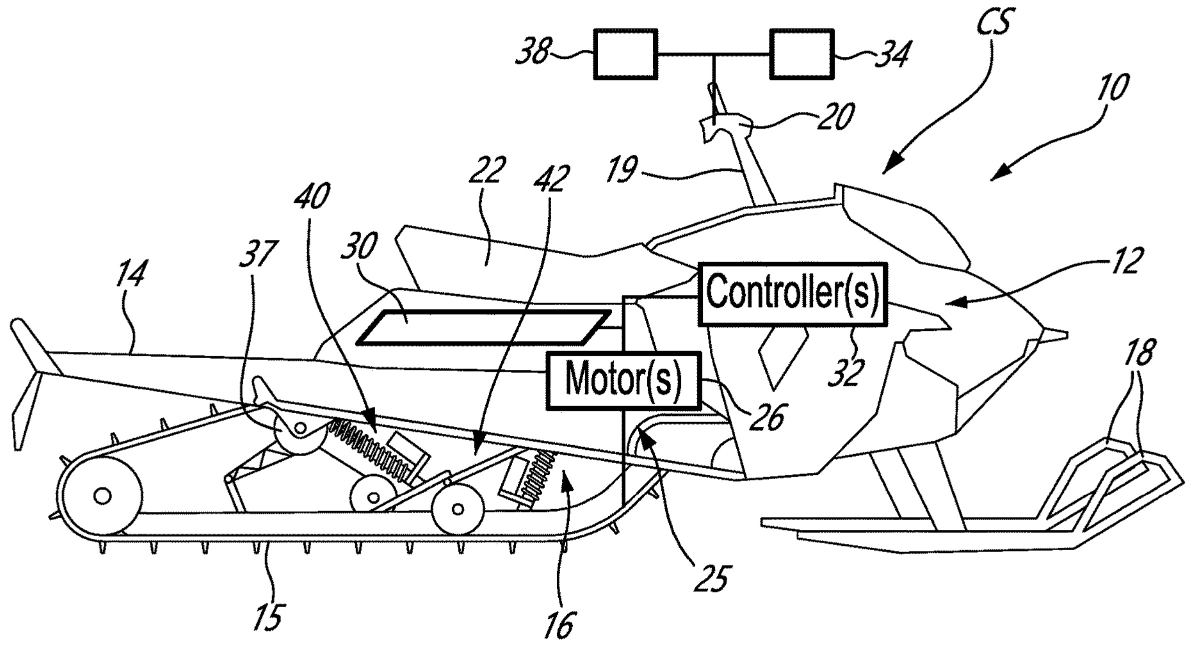
FIG. 1 is a schematic side elevational view of a snowmobile according to an embodiment.

With reference to FIG. 1, a snowmobile in accordance with one embodiment is shown at 10. In some embodiments, the snowmobile 10 includes elements of the snow vehicle described in International Patent Application no. WO 2019/049109 A1 entitled “Battery arrangement for electric snow vehicles” the entirety of which is incorporated by reference in the present disclosure.

The snowmobile 10 may include a body 12 (also known as a frame or a chassis) which may include a tunnel 14, a drive track 15 having the form of an endless belt for engaging the ground (e.g., snow) and disposed under the tunnel 14, and a powertrain 16 mounted to the body 12 and configured to displace the drive track 15. Left and right skis 18 may be disposed in a front portion of the snowmobile 10, and a straddle seat 22 may be disposed above the tunnel 14 for accommodating an operator of the snowmobile 10 and optionally one or more passengers. Left and right skis 18 may be movably attached to the body 12 to permit steering of the snowmobile 10 via a steering assembly including a steering column 19 connected to a handle 20.

Figure 1A:
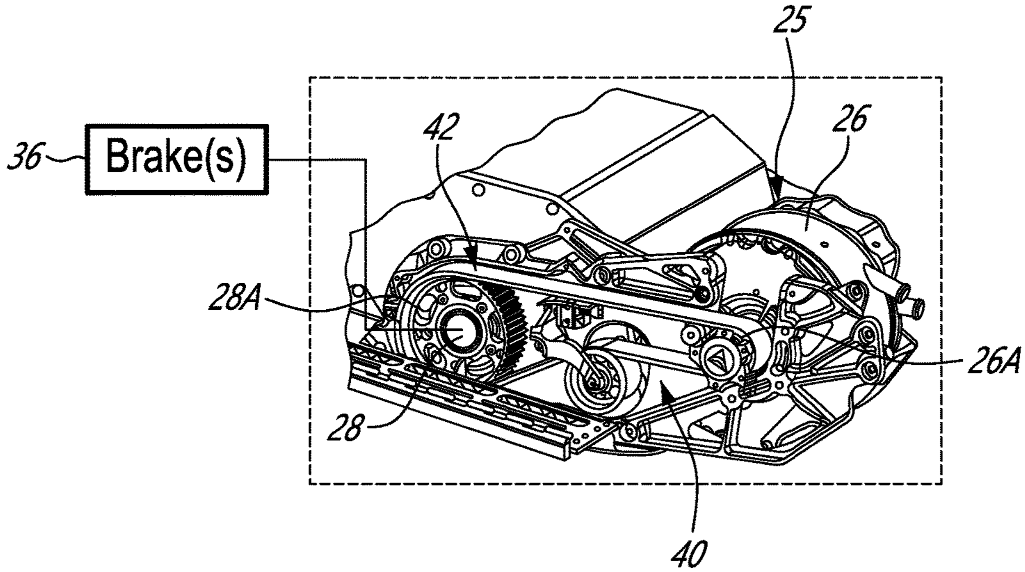
FIG. 1A is an enlarged perspective view of an exemplary part of the snowmobile of FIG. 1.

Referring to FIGS. 1 and 1A, the powertrain 16 of the snowmobile 10 may include an electric motor assembly 25. The electric motor assembly 25 may be a collection of components and features which function to deliver an electric drive to displace the snowmobile 10. The electric motor assembly 25 may include one or more electric motor(s) 26 drivingly coupled to the drive track 15 via a drive shaft 28. In one embodiment, the electric motor 26 has a maximum output power of between 120 and 180 horsepower. In other embodiments, the electric motor 26 may have a maximum output power of at least 180 horsepower. The drive shaft 28 may be drivingly coupled to the drive track 15 via one or more toothed wheels or other means so as to transfer motive power from the electric motor 26 to the drive track 15 and thereby propel the snowmobile 10. The powertrain 16 may also include one or more batteries 30 or battery modules for providing electric energy (i.e. electric current) to the electric motor 26 and driving the electric motor 26. Battery(ies) 30 may be part of a main battery pack 33 (shown in FIG. 3C) used for propelling the snowmobile 10, and may be referred to as a "motoring" battery. The operation of the electric motor 26 and the delivery of drive current to the electric motor 26 from the battery 30 may be controlled by a controller 32 based on an actuation of an input device 34, sometimes referred to as a "throttle" or "accelerator", by the operator. The controller 32 and the input device 34 may be part of a control system CS for controlling operation of the snowmobile 10. In some embodiments, the battery 30 may be a lithium ion or other type of battery 30. The battery cells of battery pack 33 may be pouch cells, cylindrical cells and/or prismatic cells, for example.

The electric snowmobile 10 may also include one or more brake(s) 36 (referred hereinafter in the singular) that may be applied or released by an actuation of a brake actuator (e.g., lever) 38 by the operator for example. The brake 36 may be operable as a main brake for the purpose of slowing and stopping the electric snowmobile 10 during motion of the electric snowmobile 10. The brake 36 may comprise a combination of tractive braking and regenerative braking. In some embodiments, the brake 36 may be operable as described in U.S. patent application Ser. No. 17/091,712 entitled "Braking system for an off-road vehicle", the entirety of which is incorporated herein by reference. Alternatively or in addition, the brake 36 may be operable as a parking brake, sometimes called "e-brake" or "emergency brake", of the electric snowmobile 10 intended to be used when the electric snowmobile 10 is stationary. In various embodiments, such main and parking brake functions may use separate brakes, or may use a common brake 36. In some embodiments of tractive braking, the brake actuator 38 may be lockable when the brake 36 is applied in order to use the brake 36 as a parking brake. The brake 36 may be electrically or hydraulically operated. For example, the brake 36 may include a master cylinder operatively coupled to a brake caliper that applies brake pads against a brake rotor that is coupled to the powertrain 16. In some embodiments, such brake rotor may be secured to and rotatable with the drive shaft 28. In some embodiments of regenerative braking shown in FIG. 1, the brake 36 may be electrically connected to the battery 30. The brake 36 may be a regenerative brake 36, or applies regenerative braking, such that the brake 36 or components thereof are able to supply the battery 30 with electric energy when the brake 36 is applied to a component of the powertrain 16, and/or when the operator releases the accelerator 34.

Referring to FIGS. 1 and 1A, the electric motor 26 is in torque-transmitting engagement with a drive shaft 28 via a transmission 40. The transmission 40 may be of a belt/pulley type, a chain/sprocket type, or a shaft/gear type for example. Referring to FIG. 1A, the transmission 40 is of a belt/pulley type. The transmission 40 may include a drive belt 42 that is mounted about a motor output 26A of the electric motor 26, and may also be mounted about a drive track wheel 28A for driving the drive shaft 28. The drive belt 42 may therefore extend between the motor output 26A and the drive track wheel 28A for conveying torque from the electric motor 26 to the drive shaft 28. The drive shaft 28 may provide torque to the drive track 15. The drive belt 42 may be thus displaced or driven by the motor output 26A in a linear manner between the motor output 26A and the drive track wheel 28A, and in a circumferential manner about the motor output 26A and the drive track wheel 28A.

Figure 2A:
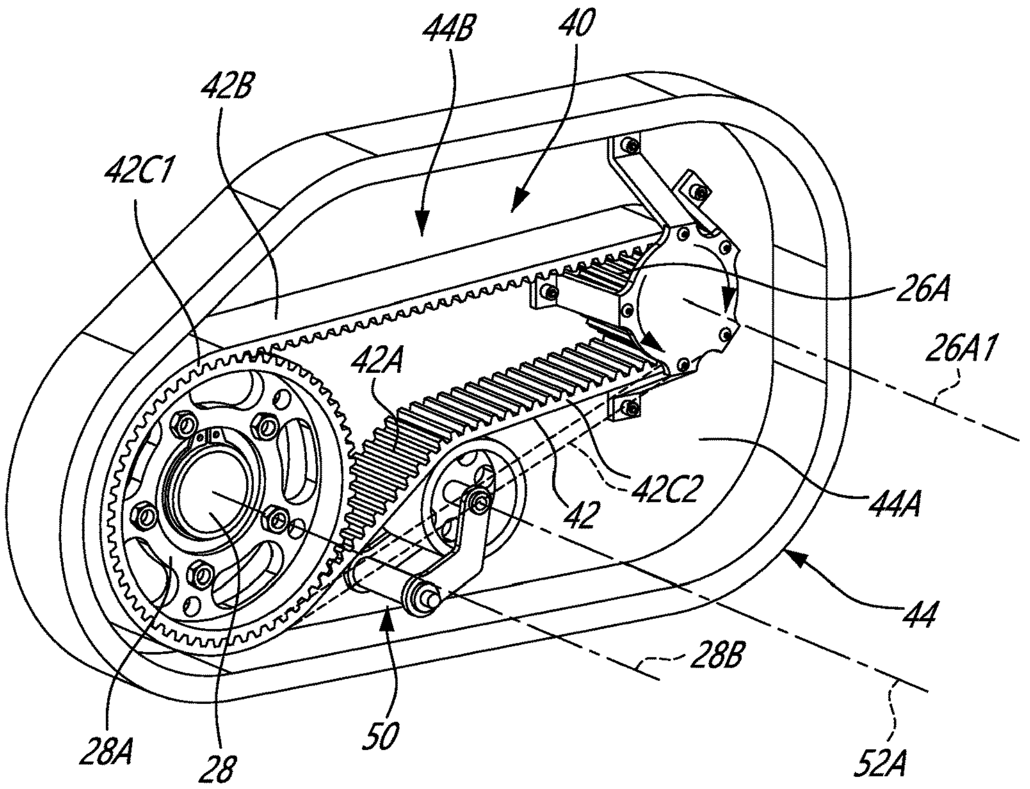
FIG. 2A is a perspective view of an exemplary transmission for the electric snowmobile of FIG. 1.

Referring to FIG. 2A, the drive track wheel 28A rotates with the drive shaft 28 about a drive shaft axis 28B. The motor output 26A may have any suitable configuration to achieve such functionality. For example, and referring to FIG. 2A, the motor output 26A may be a wheel, pulley, gear or shaft that is rotatable about a motor output axis 26A1 and which may engage the drive belt 42 with minimal or no slip therebetween. The motor output 26A may have any suitable feature, such as teeth, lugs, etc., which facilitates engagement with the drive belt 42. The drive belt 42 may have any suitable configuration to achieve the functionality ascribed to it herein. For example, and referring to FIG. 2A, the drive belt 42 may contain an elastomer and may have a ribbed or toothed inner side 42A defining an inner surface of the drive belt 42 for engaging the motor output 26A and the drive track wheel 28A, and a smooth or flat outer side 42B defining an outer surface of the drive belt 42. In one possible configuration, the drive belt 42 is a carbon fiber-reinforced elastomer. In another possible configuration, the drive belt 42 may be a chain belt or chain which is engaged and driven by teeth of the motor output 26A and the drive track wheel 28A. The drive belt 42 is thus used to transmit power from the motor output 26A. The drive belt 42 may provide tractive force to the electric snowmobile 10 and transfer mechanical energy from the electric motor 26 to the drive track wheel 28A.

Figure 2B:
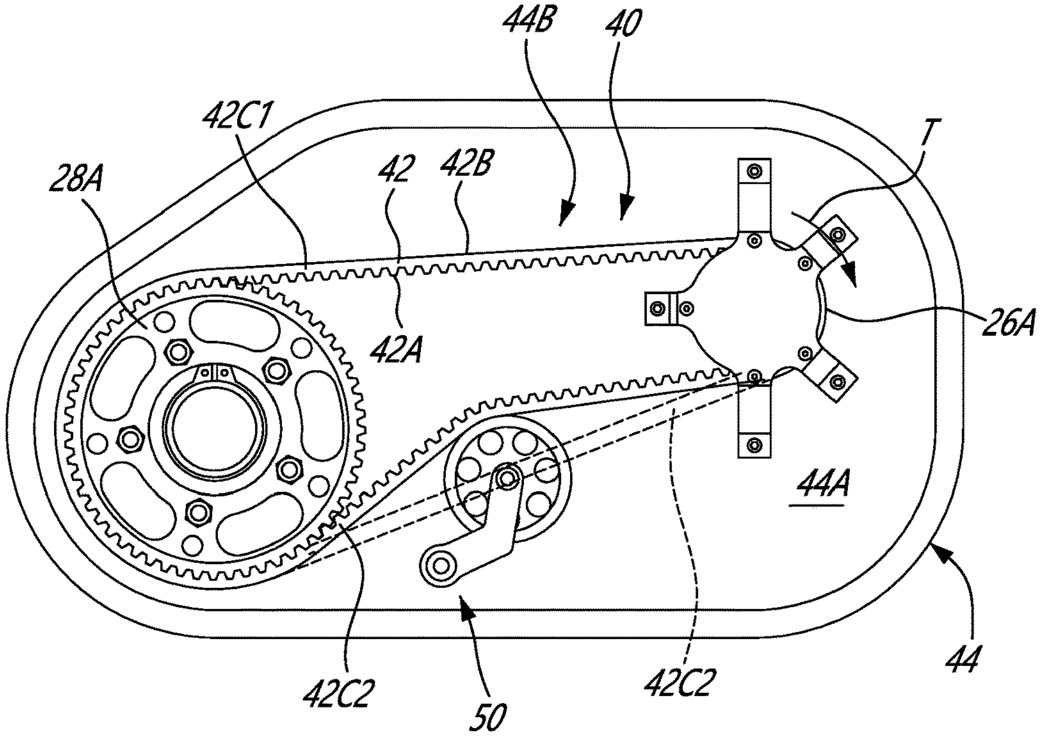
FIG. 2B is a side elevational view of the transmission of FIG. 2A.

In some embodiments of the powertrain 16, the electric motor 26 and the drive shaft 28 may be horizontally spaced apart from each other. The drive shaft axis 28B and the motor output axis 26A1 may also be horizontally spaced apart from each other and parallel to each other. In FIGS. 2A and 2B, the electric motor 26 and the drive shaft 28 are horizontally spaced apart from each other along the length of the electric snowmobile 10. The powertrain 16 may also have any other suitable orientation to displace the drive track 15. For example, in another embodiment of the powertrain 16, the electric motor 26 and the drive shaft 28 may be vertically spaced apart from each other.

FIGS. 2A and 2B show a transmission housing 44 which is part of the body 12 of the electric snowmobile 10. The transmission housing 44 may be an object or body which houses the transmission 40 and/or other components of the powertrain 16. The transmission housing 44 may have any suitable configuration to achieve this functionality. For example, and referring to FIGS. 2A and 2B, the transmission housing 44 may include a wall 44A which defines part of a partially or fully enclosed interior 44B of the transmission housing 44. The motor output 26A may be disposed in the interior 44B and may be rotatably mounted to the wall 44A with bearings or the like. The drive track wheel 28A and part of the drive shaft 28 may be disposed in the interior 44B, and are rotatably mounted to the wall 44A with bearings or the like. The drive belt 42 may be disposed in the interior 44B of the transmission housing 44 and mounted about the motor output 26A and about the drive track wheel 28A. The motor output 26A and the drive track wheel 28A may be horizontally spaced apart from each other along the length of the transmission housing 44 and may be vertically spaced apart from each other along a height of the transmission housing 44.

Referring to FIGS. 2A and 2B, the electric motor 26 and its motor output 26A may output a torque T. The drive belt 42 may be driven by the torque T, and may transmit the torque T to the drive track wheel 28A in order to rotate the drive shaft 28 about the drive shaft axis 28B and displace the drive track 15. The torque T generated by the electric motor 26 is thus experienced by the drive belt 42. Referring to FIGS. 2A and 2B, the engagement of the drive track wheel 28A and the motor output 26A may divide the drive belt 42 into a first segment 42C1 and a second segment 42C2. The first and second segments 42C1, 42C2 may be substantially linear portions of the drive belt 42, each of which extending between the drive track wheel 28A and the motor output 26A. The first segment 42C1 may extend between tangential portions of the drive track wheel 28A and the motor output 26A on one radial side of the drive track wheel 28A and the motor output 26A, and the second segment 42C2 may extend between tangential portions of the drive track wheel 28A and the motor output 26A on another, opposite radial side of the drive track wheel 28A and the motor output 26A. The first and second segments 42C1, 42C2 may exclude the portions of the drive belt 42 that are wrapped around the drive track wheel 28A and the motor output 26A at any given moment. The first and second segments 42C1, 42C2 may be spaced apart from each other at each of their ends by the diameters of the drive track wheel 28A and the motor output 26A. The transmission 40 may optionally have a drive belt tensioner 50 to apply tension to one or both of the first and second segments 42C1, 42C2. In some embodiments, and as described in greater detail below, the transmission 40 may be free of the drive belt tensioner 50.

FIGS. 3A, 3B, 3C and 4 show a snowmobile 110 in accordance with another embodiment. Snowmobile 110, as well as tunnel 114, body 112, track 115, motor assembly 125, motor 126 battery modules 130, may be similar to tunnel 14, body 12, track 15, motor assembly 25, motor 26 and battery modules 30 of snowmobile 10.

Figure 3A:
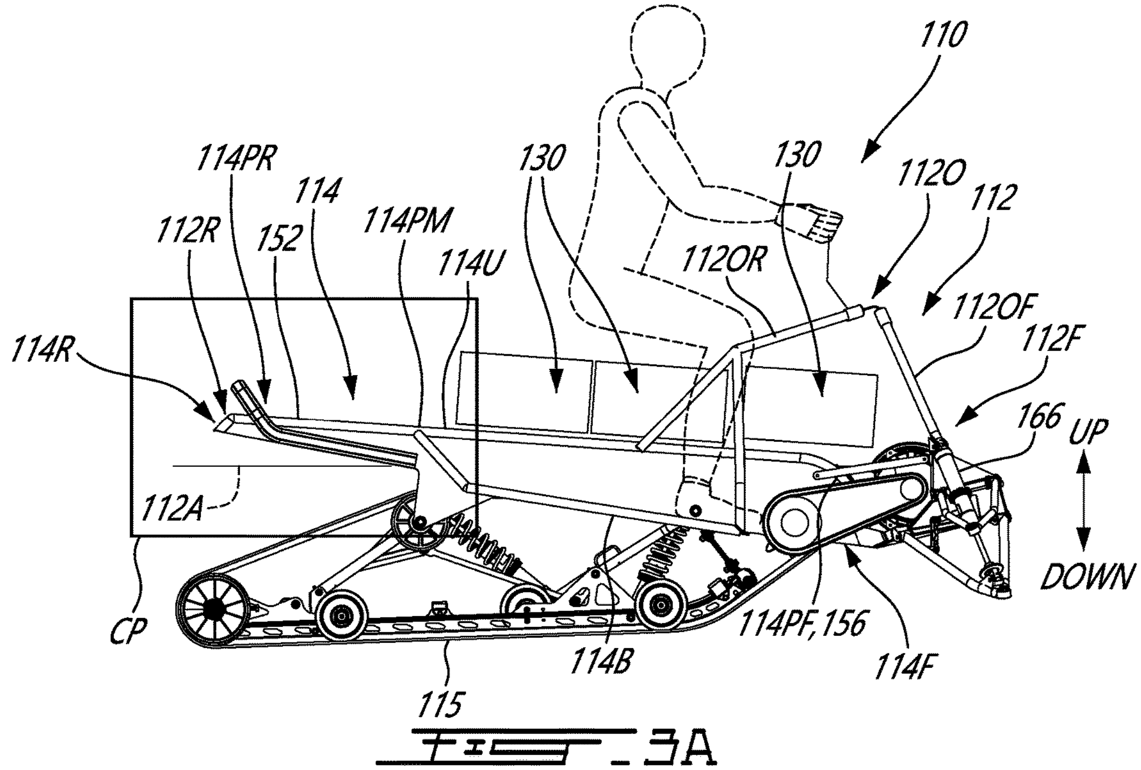
FIG. 3A is a schematic side elevational view of part of a snowmobile according to an embodiment.
Figure 3B:
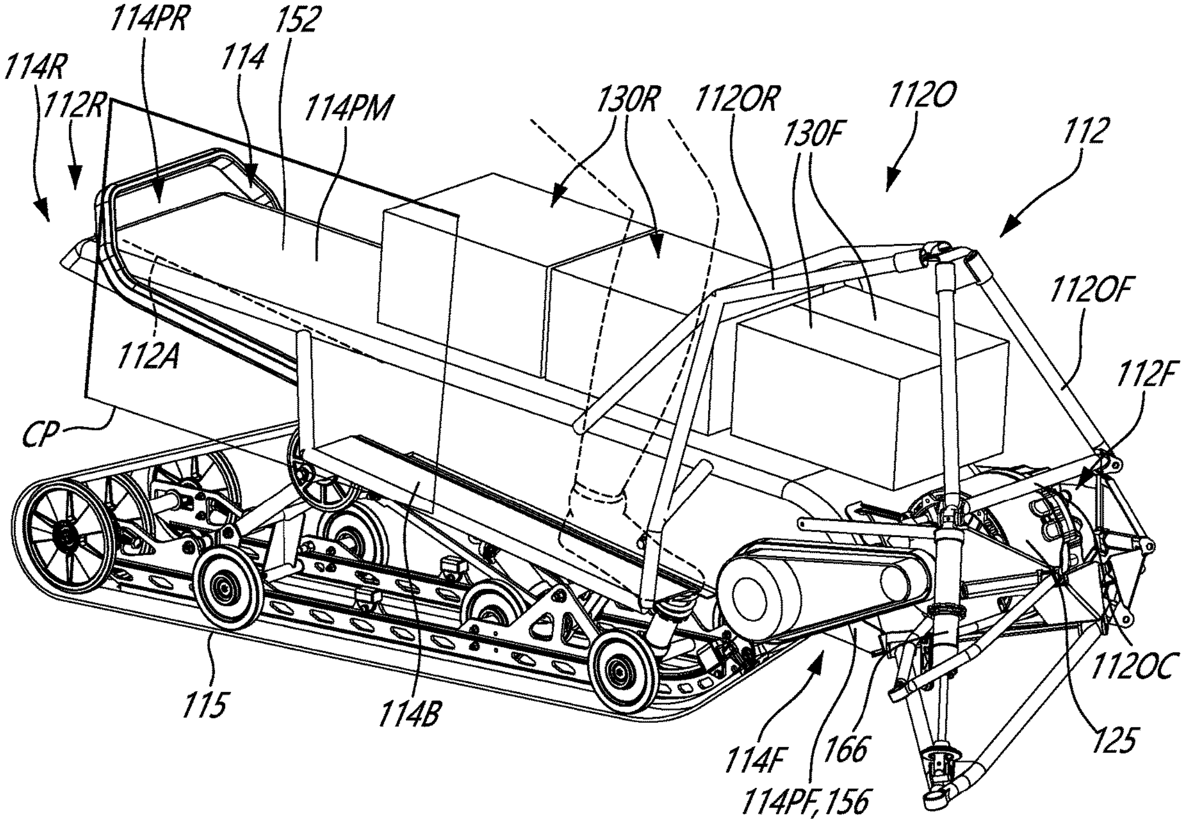
FIG. 3B is a schematic perspective view of part of the snowmobile of FIG. 3A.

Referring to FIGS. 3A and 3B, the body 112 (also known as a frame or a chassis) may include structural or load-bearing components to support the loads generated during operation of the snowmobile 110. The body 112 and at least some of its components may be elongated, and extend along a longitudinal axis 112A between a front end 112F of the body 112 and a rear end 112R. Referring to FIGS. 3A and 3B, the longitudinal axis 112A is a center axis of the body 112. The body 112 may define a center plane CP being an upright plane containing the longitudinal axis 112A. The center plane CP may divide the body 112 into two equal lateral sides (e.g. left and right sides of the snowmobile 110). The front and rear ends 112F, 112R may be defined with respect to the direction of travel of the snowmobile 110, in that the front end 112F is the end of the body 112 that faces toward the forward direction of travel of the snowmobile 110. Similarly, the rear end 112R is the end of the body 112 that faces toward the aft or reverse direction of travel of the snowmobile 110.

Referring to FIGS. 3A and 3B, the tunnel 114 of the body 112 is an elongated component extending in a direction parallel to the longitudinal axis 112A of the body 112. A rear end 114R of the tunnel 114 is disposed at, or defines, the rear end 112R of the body 112. The tunnel 14 extends from the rear end 114R in a forward direction to a front end 114F. In the example of the tunnel 114 shown in FIGS. 3A and 3B, much of the tunnel 114 is positioned closer to the rear end 112R of the body 112 such that the tunnel 114 forms the rearmost portions of the body 112. In such a configuration, the tunnel 114 may sometimes be referred to as a "rear" tunnel 114. The tunnel 114 may comprise a top panel 152 and left and right side walls, such as 354A, 354B (shown in FIG. 6A) that extend downwardly substantially transverse to the top panel 152. The tunnel 114 may overlie the drive track 115 and may at least partially enclose the drive track 115 from above. The tunnel 14,114 may be positioned vertically between the straddle seat 22 (see FIG. 1) and the drive track 15, 115. The tunnel 114 may be aligned with the longitudinal axis 112A of the body 112. The tunnel 114 may be symmetric about the center plane CP. The center plane CP may be laterally centered relative to the tunnel 114. The tunnel 114 may be a structural or load-bearing component which functions to support and/or distribute loads generated during operation of the snowmobile 110.

The tunnel 14, 114 may have any shape or configuration to achieve the functionality ascribed to the tunnel 14, 114 herein. For example, and referring to FIGS. 3A and 3B, the tunnel 114 may include a rear portion 114PR, a forward portion 114PF, and a middle portion 114PM extending between and interconnecting the rear and forward portions 114PR, 114PF. The rear, front and middle portions 114PR, 114PF, 114PM may be monolithic or integral so as to form a single-piece tunnel 114, or they may be separate components joined together to form an assembled tunnel 114. The rear portion 114PR may be disposed at, or define, the rear end 114R of the tunnel 114 and/or the rear end 112R of the body 112. The front portion 114PF may be disposed at, or define, the front end 114F of the tunnel 114. The front portion 114PF may comprise a front bulkhead 156 that extends downwardly in relation to the top panel 152 of the tunnel 114. The front portion 114PF of the tunnel 114 may be transverse to the middle portion 114PM and/or the top panel 152 of the tunnel 114. Alternatively, the front portion 114PF of the tunnel 114 may form a non-zero angle with a plane defined by the middle portion 114PM and/or the top panel 152 of the tunnel 114. In the example configuration of the tunnel 114 shown in FIGS. 3A and 3B, the front portion 114PF is a curved body having a center of curvature positioned beneath the tunnel 114. In an alternative example configuration of the tunnel 114, the front portion 114PF may be a separate plate that extends downwardly from the top panel 152 at an angle. In some embodiments, a cross-section of the tunnel 114 taken in a plane that is perpendicular to the longitudinal axis 112A may have a configuration of the top panel 152 and the left and right side walls together substantially defining an inverted U. The (vertical) height of the left and right side panels (not shown in FIGS. 3A & 3B) may vary along the longitudinal axis 112A of the vehicle 110. In one example embodiment, the height of the left and right side panels may increase from the rear end 114R to the front end 114F of the tunnel 114.

As previously described, the tunnel 114 may comprise substantially vertically-oriented side walls disposed on opposite sides of the longitudinal axis 112A for further enclosing the drive track 115. In some embodiments, the tunnel 114 may include a running board 114B or footrest on each of the left and right sides of the snowmobile 110 against which the operator may rest their feet. Each running board 114B may have a length defined along the longitudinal axis 112A and may extend laterally outwardly from one of the side walls of the tunnel 114. In an alternate configuration, each running board 114B may extend from the side of another part of the body 112. The tunnel 114 may be made of any suitable material or materials. Some non-limiting examples of materials for the tunnel 114 include metal, polymer composites, and a combination of metal and polymer composites. The tunnel 114 may be supported in whole or in part by a rear suspension system of the snowmobile 110. In some embodiments, the tunnel 114 may be immobile within the snowmobile 110 and experiences no movement relative to other components of the body 112.

Figure 3C:
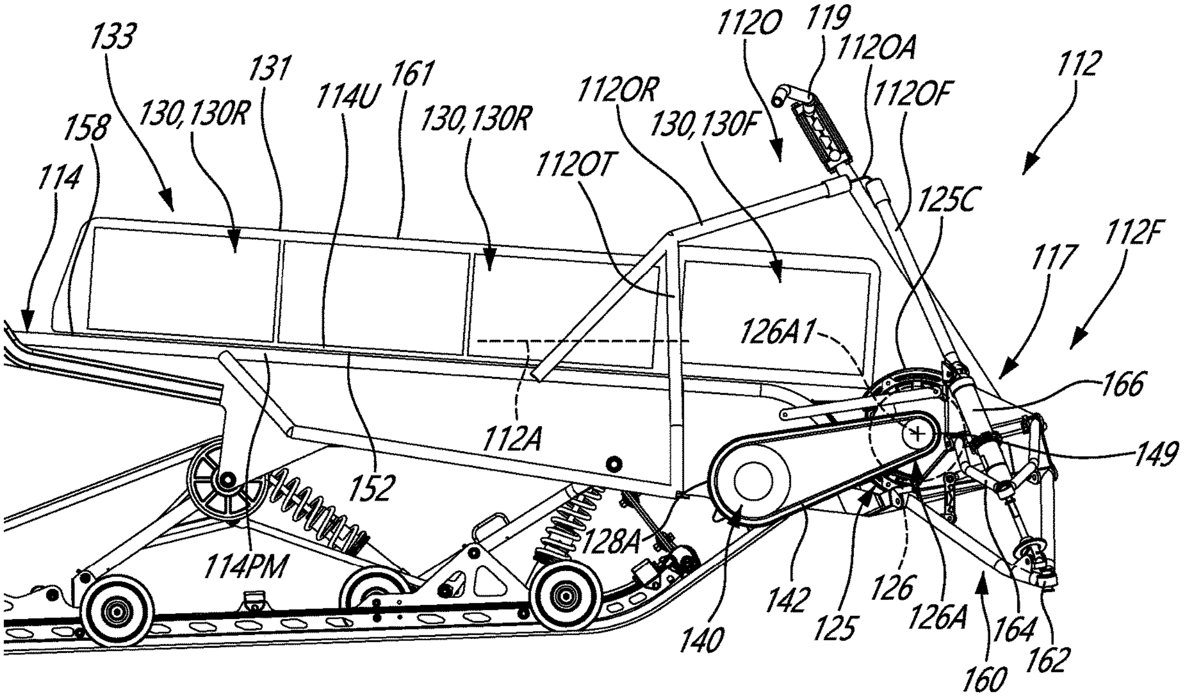
FIG. 3C is another schematic side elevational view of part of the snowmobile of FIG. 3A.

Referring to FIG. 3C, the body 112 may include the tunnel 114 forming a rear or aft portion of the body 112, and the body 112 may also include a front sub-frame 117. FIG. 3C shows a schematic representation of the position and connection points of the front sub-frame 117. The front sub-frame 117 may be disposed forward of, and be connected (e.g., fastened) to, the tunnel 114. The front sub-frame 117 may be disposed at, or define, the front end 112F of the body 112. The front sub-frame 117 may be a structural or load-bearing component which functions to support and/or distribute loads generated during operation of the snowmobile 110. For example, the front sub-frame 117 may be connected to, and support, a front suspension 160 of the snowmobile 110 as well as a steering column 119 operatively connected to ground engaging members, such as skis 18 (e.g., shown in FIG. 1). The front suspension 160 may be located at the front end 112F of the body 112, be connected to the skis 118, and may function to absorb loads and shocks from the left and right skis 118 during operation of the snowmobile 110, thereby eliminating or reducing the effect of such loads and shocks on the body 112 and on the operator. The front sub-frame 117 may thus be connected to the skis 118 via the front suspension 160. The front sub-frame 117 may be an assembly of different components, at least some of which may be described in greater detail below.

Referring to FIG. 3C, as explained in greater detail below, the front sub-frame 117 may support the electric motor assembly 125. The electric motor assembly 125 may be mounted to the front sub-frame 117, and any loads generated by the electric motor assembly 125 may be entirely supported by the front sub-frame 117. The front sub-frame 117 may also rotatably support the steering column 119 of the snowmobile 110 (e.g., via suitable bearing mount), which may be rotated by the operator when the operator manipulates the handle 20 (see FIG. 1) of the steering assembly in order to rotate the ground engaging members (i.e. skis 18) to effect steering. Thus, in the configuration of the front sub-frame 117 shown in FIG. 3C, the front sub-frame 117 is a component of the body 112 which supports the electric motor assembly 125, which supports the front suspension 160, and which supports the steering column 119.

Referring to FIG. 3C, the body 112 may include an overstructure 112O. The overstructure 112O may be a structural or load-bearing component which helps to support the loads generated during operation of the snowmobile 110. The overstructure 112O may be a component which is positioned vertically above at least a portion of the tunnel 114 and the front sub-frame 117, and hence is a structure disposed "over" these components of the body 112. In some embodiments, the front sub-frame 117 may be connected directly to a front end of the tunnel 114 to provide a first load path between the front sub-frame 117 and the tunnel 114. The overstructure 112O may extend between and interconnect the tunnel 114 and the front sub-frame 117 to provide a second load path between the front sub-frame 117 and the tunnel 114. The overstructure 112O may have any suitable shape or configuration to achieve the function ascribed to it herein. For example, and referring to FIG. 3C, the overstructure 112O may be a brace or frame. The overstructure 112O may include left and right rear legs 112OR, and left and right forward legs 112OF located forward of the rear legs 112OR. The rear legs 112OR may be elongated members that extend in a forward direction from a lower end fixedly mounted to the middle portion 114PM of the tunnel 114 towards an upper end. The forward legs 112OF are elongated members that extend in an aft or rearward direction from a lower end fixedly mounted to the front sub-frame 117 towards an upper end. In one embodiment, the right forward leg 112OF and right rear leg 112OR may be formed from a common tube element (i.e. an integrally formed segment of tubing) and the left forward leg 112OF and the left rear leg 112OR may also be formed from a common tube element. In one embodiment, the overstructure 112O may include a transverse member 112OT that extends substantially transversally to the longitudinal axis 112A and connects the left and right rear legs 112OR together. The transverse member 112OT may also connect to the right and left running boards 114B. The upper ends of the rear and forward legs 112OR, 112OF meet at, and form, an apex 112OA of the overstructure 112O. The overstructure 112O in the configuration of FIG. 3C spans between the front sub-frame 117 and the tunnel 114. Both the front sub-frame 117 and the tunnel 114 may support the overstructure 112O. In one embodiment, the overstructure 112O may include a cross member 112OC (shown in FIG. 3B) that extends substantially transversally to the longitudinal axis 112A and connects the left and right front legs 112OF together. In some embodiments, the cross member 112OC may be disposed forward of the motor assembly 125.

The overstructure 112O may rotatably support the steering column 119 along a portion of the length of the steering column 119. In some embodiments, and referring to FIG. 3C, an upper portion of the steering column 119 may be supported (e.g. rotatably mounted) in proximity to the apex 112OA of the overstructure 112O, and a lower portion of the steering column 119 may be supported (e.g. rotatably mounted) by the front sub-frame 117. In one embodiment, the steering column 119 may define a bend or elbow (not shown) to accommodate one or both of the battery pack 133 and motor assembly 125. This may allow to increase a size of the battery enclosure 131 and/or motor assembly 125 without interference with the steering column 119. Thus, in some embodiments, the overstructure 112O may be capable of reacting to loads from the front suspension 160 and from the steering assembly, and contributes to the torsional stiffness of the body 112. The overstructure 112O in the configuration of FIG. 3C may have a generally pyramidal shape, and it will be appreciated that other shapes and configurations for the overstructure 112O are possible. The overstructure 112O may be covered or concealed by suitable panels, cowlings or other structure of the snowmobile 110 such that it remains a concealed internal component of the snowmobile 110. In some embodiments, the overstructure 112O may be a semi-monocoque component that forms an integral part of the body 112. In some embodiments, brackets may be used to hold the components (e.g. left and right rear legs 112OR, left and right forward legs 112OF and optionally the transverse member 112OT) together. The brackets may be made of the same, or a dissimilar material, from the legs 112OF, 112OR of the overstructure 112O.

Referring to FIG. 3C, the one or more batteries 130 of the snowmobile 110 may be housed in a battery enclosure 131. The batteries 130 and the battery enclosure 131 together may be referred to as the battery pack 133. The battery enclosure 131 may be a housing or other enclosure which defines an inner volume in which the batteries 130 are located and sealed-off from environmental elements and debris external to the battery enclosure 131. The battery enclosure 131 may comprise a floor 158 and a lid 161. The battery enclosure 131 may be an elongated and at least partially-hollow component which extends in a direction parallel to the longitudinal axis 112A of the body 112. Each of the batteries 130 enclosed within the battery enclosure 131 may sometimes be referred to in this disclosure as a "battery module 130" because, in some embodiments, each battery 130 may be an assembly or collection of electrically-linked, electro-chemical cells.

The battery pack 133 may take any suitable shape or configuration to achieve the functionality ascribed to the battery pack 133 in this disclosure. For example, and referring to FIG. 3C, the battery pack 133 may be mounted on the tunnel 114. The battery pack 133 may be positioned, at least partially, over the middle portion 114PM and the front portion 114PF of the tunnel 114, as well as over a portion of the front sub-frame 117. Thus, the battery pack 133 may be disposed over the tunnel 114 and is connected to at least the top panel 152 of the tunnel 114. The battery pack 133 may further be connected to a portion of the front sub-frame 117. The straddle seat 22 (see FIG. 1) may be disposed over the battery pack 133.

Referring to FIG. 3C, one or more of the battery modules 130 may be disposed on, supported by, and/or mounted to the tunnel 114 via the floor 158 of the battery enclosure 131. The battery enclosure 131 and/or the battery modules 130 may be rigidly connected to the rear tunnel 114 via mechanical fasteners such as nuts and bolts, and/or rivets for example. In some embodiments, a bottom portion or floor 158 of the battery enclosure 131 may be connected to the rear tunnel 114 more permanently via welding, soldering or adhesion among other possibilities. In such a case, an upper portion or lid 161 of the battery enclosure 131 may then be fastened to the floor 158 via mechanical fasteners, a friction fit, a snap fit or any other suitable removable fastening mechanism. The battery enclosure 131 may have any shape or configuration that is suitable for housing one or more battery modules 130 and attaching to the tunnel 114.

The battery modules 130 may be arranged in any suitable manner within the battery enclosure 131. For example, and referring to FIG. 3C, the battery modules 130 may include aft or rear battery modules 130R disposed closer to the rear end 114R of the tunnel 114 than forward battery modules 130F. The rear battery modules 130R may be positioned over and/or supported by the middle portion 114PM of the tunnel 114. The forward battery modules 130F may be positioned over both the middle and front portions 114PM, 114PF of the tunnel 114, and in some cases partially over the front sub-frame 117 (not shown in FIG. 3C). Referring to FIG. 3C, the forward battery modules 130F may be the forwardmost battery modules 130 because they may be the battery modules 130 closest to the front end 112F of the body 112. In one example implementation, there may be one or two forward battery module 130F disposed closer to the front end 112F, and three rear battery modules 130R disposed rearward of the forward battery modules 130F.

Referring to FIG. 3B, the battery modules 130 may be aligned with the center plane CP. The center plane CP may extend through all the rear battery modules 130R. Referring to FIG. 3C, the overstructure 112O may be at least partially positioned or disposed above the battery modules 130 and the battery pack 133. In some embodiments, the rear legs 112OR may be partially positioned above the battery pack 133. The apex 112OA of the overstructure 112O may be positioned above the battery modules 130 and above the battery pack 133. The presence of the overstructure 112O may allow for some or all of the battery enclosure 131 to avoid receiving external loads. Such a battery enclosure 131 that is not required to support important loads may be made from lighter and/or cheaper materials. In one possible configuration of the battery enclosure 131, the battery enclosure 131 mounted to the tunnel 114 may be structural, such that it may be designed to support external loads from one or more of the front suspension, the straddle seat 122 and the steering column 119. Such a battery enclosure 131 may be made from composite materials having relatively strong material properties.

Figure 4:
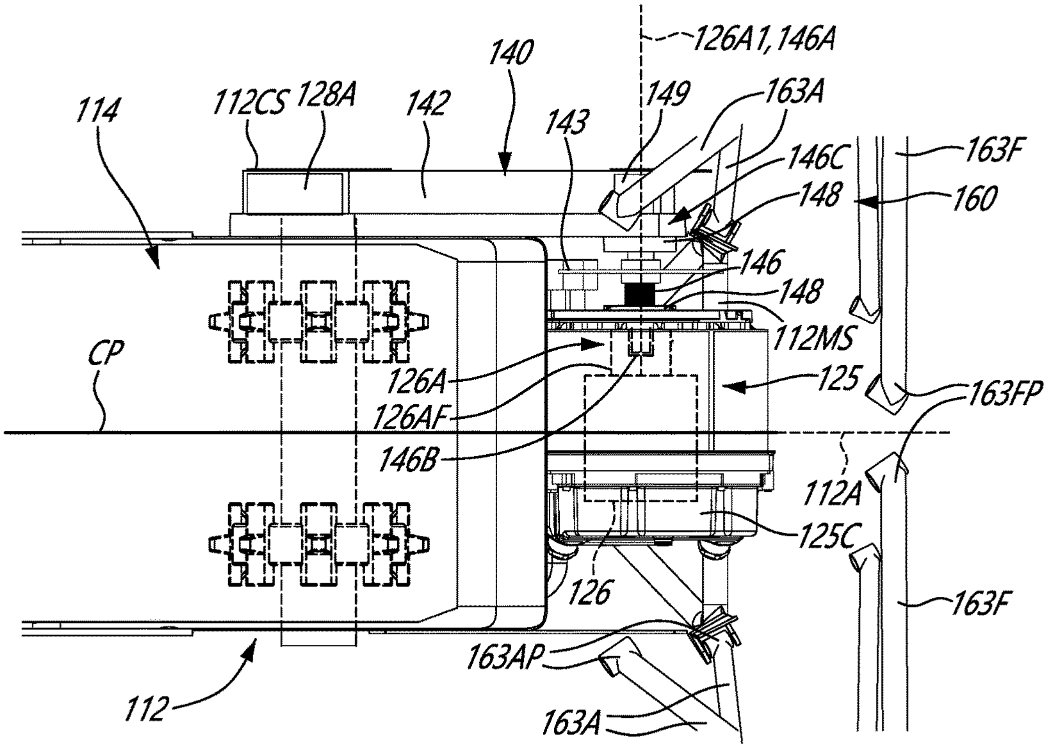
FIG. 4 is a schematic bottom view of part of the snowmobile of FIG. 3A.

Referring to FIGS. 3C and 4, the electric motor assembly 125 may include the motor 126 and a motor casing 125C or housing which encloses the electric motor 126 and seals the electric motor 126 from the environment outside of the motor casing 125C. In some embodiments, the motor casing 125C may be a cylindrical body enclosing the electric motor 126 and optionally the motor controller (e.g., power inverter). The motor casing 125C may be mounted to the body 112. Referring to FIG. 3C, the motor casing 125C may be mounted to the front sub-frame 117 of the body 112, such that the front sub-frame 117 supports the loads generated by the electric motor assembly 125 during operation of the electric motor 126. The motor casing 125C may have an opening or some other access which allows the motor output 126A to transmit a rotational drive to the drive belt 142 of the transmission 140. The electric motor assembly 125 may include other components as well, at least some of which are described in greater detail below.

Referring to FIG. 4, the motor output 126A may include a female spline 126AF that provides a rotational output drive about the motor output axis 126A1. The female spline 126AF may be disposed within the motor casing 125C or outside the motor casing 125C. The motor casing 125C may have an opening or other suitable access to provide access to the female spline 126AF. The female spline 126AF may be any rotatable recess or groove which has teeth configured to mesh with the teeth of another, male rotational component. One such male rotational component may be a transmission shaft 146 (sometimes referred to as "jackshaft") of the transmission 140. The transmission shaft 146 may be an elongated body defining a transmission shaft axis 146A about which the transmission shaft 146 is rotatable. The transmission shaft axis 146A may be collinear with the motor output axis 126A1 in FIG. 4, such that the transmission shaft 146 is coaxial with the motor output axis 126A1. The transmission shaft 146 may extend along the transmission shaft axis 146A between a first end 146B having a male spline or teeth meshed with the female spline 126AF, and a distal second end 146C. In some embodiments, the transmission shaft 146 may have a 1:1 ratio between rotation at the first end 146B and the distal second end 146C of the transmission shaft axis 146A. For example, the transmission shaft 146 may be a single, integral shaft. An output speed at the distal second end 146C of the transmission shaft axis 146A may be substantially equivalent to an input speed at the first end 146B of the transmission shaft axis 146A. In some embodiments, positioned between the first end 146B and the distal second end 146C of the transmission shaft 146 may be one or more gears, secondary shafts or clutches such that an output speed at the distal second end 146C of the transmission shaft axis 146A may differ from the input speed at the first end 146B of the transmission shaft axis 146A.

The second end 146C may be coupled to a transmission drive wheel 149 of the transmission 140, such that the transmission drive wheel 149 (sometimes referred to herein simply as "drive wheel 149") is rotated about the motor output axis 126A1 by the transmission shaft 146. The drive wheel 149 may be engaged with the drive belt 142 and transmit torque to the drive belt 142.

The transmission shaft 146 at, or adjacent to, each of the first and second ends 146B, 146C may be supported by bearings 148 of the transmission 140. The bearings 148 may be supported by the body 112. In some embodiments, the bearings 148 may be supported by the front sub-frame 117. In some embodiments, since the transmission shaft 146 is hard-mounted to the body 112 via the bearings 148, the electric motor 126 may only have to react to torque loads, such that the electric motor 126 may be soft-mounted within the front sub-frame 117 via suitable motor mount(s) which may help to reduce NVH (noise-vibration-harshness). Thus, in some embodiments, an example of which is shown in FIG. 4, the transmission shaft 146 may be a jackshaft or countershaft, which is used to transfer a torque from the motor output 126A to the drive track wheel 128A (sometimes called drive sprocket). The transmission shaft 146 may be supported by bearings 148 at its ends 146B, 146C, and the transmission shaft 146 may drive gears or cranks (i.e. the drive wheel 149) attached to it. The transmission shaft 146 may thus be used as an intermediary transmitting power from a driving source (e.g. the female spline 126AF) to a driven body (e.g. the drive wheel 149). The jackshaft may have a male-splined first end 146B to connect the motor output 126A to the drive wheel 149. In some embodiments, the jackshaft may have a male-spline at each of the first and second ends 146B, 146C.

Referring to FIG. 4, the transmission 140 may include a transmission brake 143. The transmission brake 143 may function in coordination with, or independently of, the brake 136 of the snowmobile 110 described above. In some embodiments, the transmission brake 143 may replace the brake 136 in communication with the drive shaft 128. The transmission brake 143 may be any suitable disc, pad or other object mounted to engage the transmission shaft 146 at a location along its length that is between the first and second ends 146B, 146C. In some embodiments, the transmission brake 143 may be activated by actuation of the brake actuator 138 by the operator. In some embodiments, the transmission brake 143 is the only brake of the powertrain 116 and/or of the snowmobile 110, and is activated by the brake actuator 38 (see FIG. 1). In such an embodiment, where the snowmobile's 110 brake 143 is mounted only to the transmission shaft 146 (i.e. and not to the drive shaft 128), the disc of the transmission brake 143 may be made smaller and lighter, and may provide superior braking feel. By mounting the transmission brake 143 to directly engage the transmission shaft 146 emanating from the electric motor 126, it may be possible to eliminate a brake and/or drive belt cover which may free up space on one side of the snowmobile 110, for example at the left-hand running board 114B or footrest, thereby allowing the running board 114B to be longer and extend forwardly of the tunnel front portion 114PF. Placing the transmission brake 143 on the transmission shaft 146 between the electric motor 126 and the drive wheel 149 may allow the transmission brake 143 to have the same mechanical advantage that the electric motor 126 has via the drive belt 142, which may allow for a disc of the transmission brake 143 to be made smaller for the same braking torque.

Referring to FIG. 4, the body 112 may include a motor support 112MS mounted to the motor casing 125C. The motor support 112MS may be secured (e.g., fastened) to or be integrated with part of body 112 such as the front sub-frame 117 for example. The motor support 112MS may support the electric motor assembly 125. The motor support 112MS may be any suitable bracket, member, flange, etc. which may be fixedly attached to the body 112, and which may support the bearing 148 supporting the first end 146B of the transmission shaft 146. The body 112 may have a drive belt case 112CS supporting and enclosing the drive belt 142 of the transmission 140. The drive belt case 112CS may be any suitable bracket, housing, member, flange, etc. which may be fixedly attached to the body 112 (e.g. such as to the tunnel 114), and which may support the bearing 148 supporting the second end 146C of the transmission shaft 146. Referring to FIGS. 3C and 4, the drive belt case 112CS may be mounted between the front sub-frame 117 and the rear tunnel 114. Referring to FIG. 4, the drive belt case 112CS may house at least partially the drive wheel 149. The motor support 112MS and the drive belt case 112CS may allow for the transmission shaft 146 to be supported independently from the electric motor 126, which may avoid the electric motor 126 supporting bending loads or torque loads from the drive belt 142, which may extend the life of the electric motor 126. The motor support 112MS and the drive belt case 112CS may help to promote consistency in the mounting the electric motor 126 to the snowmobile 110 (e.g., may facilitate the consistent mounting of the electric motor 126 in the same place). This, combined with a bearing 148 in the drive belt case 112CS, a bearing 148 in the motor support 112MS, and the transmission shaft 146 going into the electric motor 126, may allow for removing a drive belt tensioner from the transmission 140.

The electric motor assembly 125 may be centered relative to the body 112. For example, and referring to FIGS. 3C and 4, the electric motor 126 may be positioned along the longitudinal axis 112A of the body 112. The electric motor 126 may be aligned with the center plane CP and be located within (and supported by) the front sub-frame 117. The electric motor 126 may be positioned substantially laterally centrally within the front sub-frame 117. The electric motor 126 may be centered along the center plane CP. The electric motor 126 may be bisected by the center plane CP. The electric motor 126 may be substantially symmetrical about the center plane CP. Referring to FIG. 4, the center plane CP may extend through the motor casing 125C. Referring to FIG. 4, the center plane CP may extend through the cylindrical motor casing 125C. The electric motor casing 125C may be centered along the center plane CP. The motor casing 125C may be substantially symmetrical about the center plane CP. This centering of the electric motor 126 and the motor casing 125C may allow for most of the mass of the electric motor assembly 125 to be laterally aligned with the center of gravity or lateral center of the body 112 and/or the snowmobile 110. Referring to FIG. 4, the orientation of the motor output 126A may be transverse to the center plane CP. The motor output axis 126A1 may be perpendicular to the center plane CP. Referring to FIG. 4, the transmission shaft axis 146A may be transverse, for example normal, to the center plane CP. Referring to FIG. 4, the motor output 126A may be disposed on only one side of the center plane CP. All of the female spline 126AF may be positioned on only one side of the center plane CP. Referring to FIG. 4, each of the motor output 126A, the transmission shaft 146 and the drive wheel 149 may be disposed, in their entirety, on only one side of the center plane CP. It will be appreciated that, in at least one embodiment of the powertrain 116, an example of which is shown in FIG. 4, the electric motor 126 may be positioned along the longitudinal center axis 112A with a transverse jackshaft 146 connecting the electric motor 126 to the drive wheel 149. This configuration of the powertrain 116 may allow the electric motor 126 to be "soft-mounted" to the body 112 (e.g. such as via the motor support 112MS), using one or more simple rubber dampers (e.g., rubber mount(s), vibration islotator(s)) to absorb some vibration that may be generated by the electric motor 126.

Referring to FIG. 3C, the electric motor assembly 125 may be disposed forwardly on the snowmobile 110. The electric motor assembly 125 may be disposed closer to the front end 112F of the body 112 than to the rear end 112R. The electric motor assembly 125 may be disposed adjacent to the front end 112F. The electric motor assembly 125 may be disposed at the front end 112F of the body 112. The electric motor assembly 125 may be disposed forward of other features of the snowmobile 110. For example, and referring to FIG. 3C, some or all of the electric motor assembly 125 may be disposed forward of the battery pack 133, and thus forward of the batteries 130. Referring to FIG. 3C, at least part of the electric motor assembly 125 may be disposed closer to the front end 112F of the body 112 than the battery enclosure 131 housing the battery modules 130. The motor output axis 126A1 of the electric motor 126 is disposed forward of the battery pack 133 and/or forward of the batteries 130. By positioning some or all of the electric motor assembly 125 forwardly of the battery pack 133, it may be possible to create space within the body 112 to the position the battery pack 133 forward along the body 112, and it may become possible to position the battery pack 133 (and at least some of the battery modules 130) lower relative to the remainder of the body 112. This forward positioning of the electric motor assembly 125 and of the battery pack 133 may allow for providing a smaller (i.e. shorter) and thus lighter electric snowmobile 110. By contributing to reducing the overall length of the snowmobile 110, the forwardly-positioned electric motor housing 125 may help to reduce the overall size and weight of the snowmobile 110. The smaller the snowmobile 110 is, the lighter and simpler it may be for the same stiffness. Furthermore, positioning the electric motor assembly 125 forwardly of the battery pack 133 may allow for positioning one or more battery modules 130 closer to the ground, thereby creating space for providing the overstructure 112O.

Different configurations of the forward position of the electric motor assembly 125 are possible. For example, and referring to FIG. 3C, at least part of the electric motor assembly 125 may be positioned forwardly of the forwardmost battery module 130F. Some or all of the electric motor assembly 125 may be positioned closer to the front end 112F of the body 112 than the forwardmost battery module 130F. Referring to FIG. 3C, the motor output 126A may be positioned forwardly of the battery pack 133. Referring to FIG. 3C, the motor output axis 126A1 of the motor output 126A may be positioned closer to the front end 112F of the body 112 than the battery pack 133. Referring to FIG. 3C, most of the motor casing 125C may be positioned closer to the front end 112F of the body 112 than the battery pack 133. Referring to FIG. 3C, some of the motor casing 125C may be positioned rearward or aft of a front end of the battery pack 133, such that the motor casing 125C includes portions in front of, and rearward of, the front end of the battery pack 133. In the configuration of FIG. 3C, the battery modules 130 are not crowded together at the front end 112F of the body 112, which may allow for the steering column 119 to use a relatively simple, straight shaft without needing to add a scallop in the lid 161 of the battery pack 131. In alternative embodiments, the steering column 119 may include a bend or elbow such that it does not interfere with the battery pack 133.

Referring to FIGS. 3A and 3C, at least part of the electric motor assembly 125 may be positioned vertically above an upper surface 114U of the rear tunnel 114, and specifically an upper surface 114U of the top panel 152 of the tunnel 114. In some embodiments, some (e.g., a majority or substantially all) of the upper surface 114U of the rear tunnel 114 may be substantially planar and at least part of the electric motor assembly 125 may be disposed to an upper side of a plane defined by the upper surface 114U. The upper and lower sides of the upper surface 114U may be defined in relation to the vertical direction indicated by the UP-DOWN arrow shown in FIGS. 3A and 3C and in relation to the in-use (e.g., upright) orientation of the snowmobile 110. In some embodiments, the plane defined by the upper surface 114U may have a normal direction that is parallel to or that is oblique (i.e., at a non-zero angle) to the vertical direction.

Referring to FIGS. 3A and 3C, an upper portion of the cylindrical motor casing 125C may be positioned vertically above the plane defined by the upper surface 114U of the rear tunnel 114. Referring to FIGS. 3A and 3C, a lower portion or half of the cylindrical motor casing 125C may be positioned vertically below the plane defined by the upper surface 114U. In some embodiments, the motor output 126A and/or motor output axis 126A1 may be vertically aligned with, above or below, the plane defined by the upper surface 114U of the tunnel 114. Referring to FIG. 3C, the drive track wheel 128A may be positioned vertically below the upper surface 114U of the rear tunnel 114. Referring to FIG. 3C, the drive wheel 149 may be positioned forwardly of the battery pack 131. Referring to FIG. 3C, the drive wheel 149 is positioned vertically below the plane defined by the upper surface 114U. In other embodiment, the drive wheel 149 may be positioned vertically aligned with, or above the plane defined by the upper surface 114U.

Figure 5A:
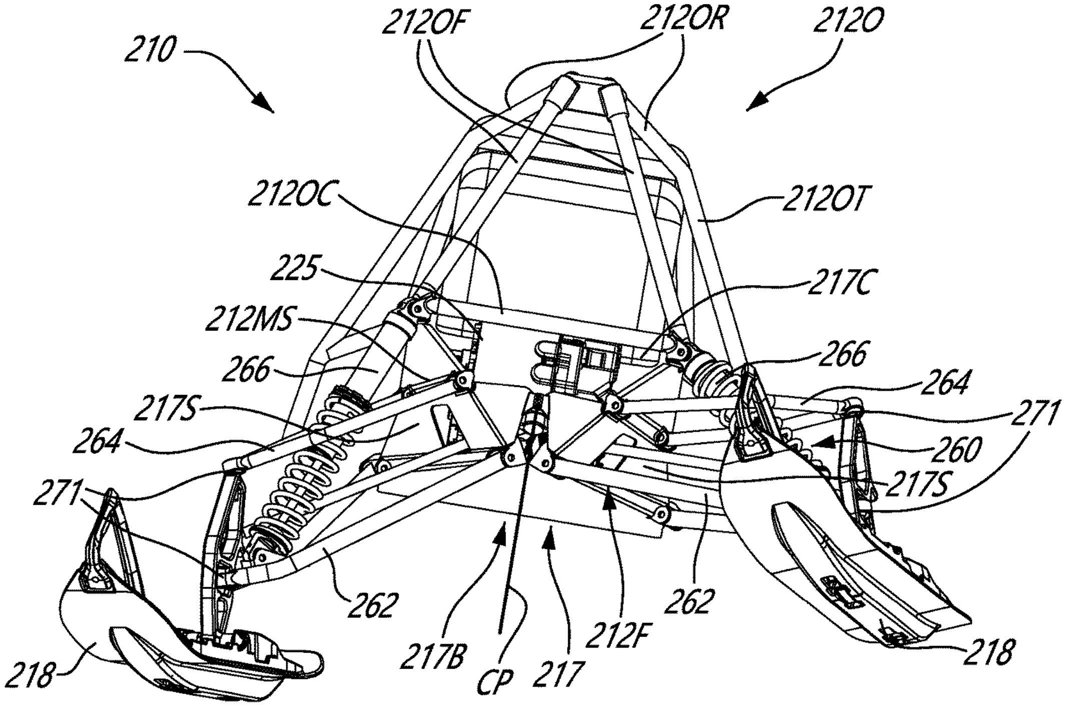
FIG. 5A is a schematic front view of part of a snowmobile according to an embodiment.
Figure 5B:
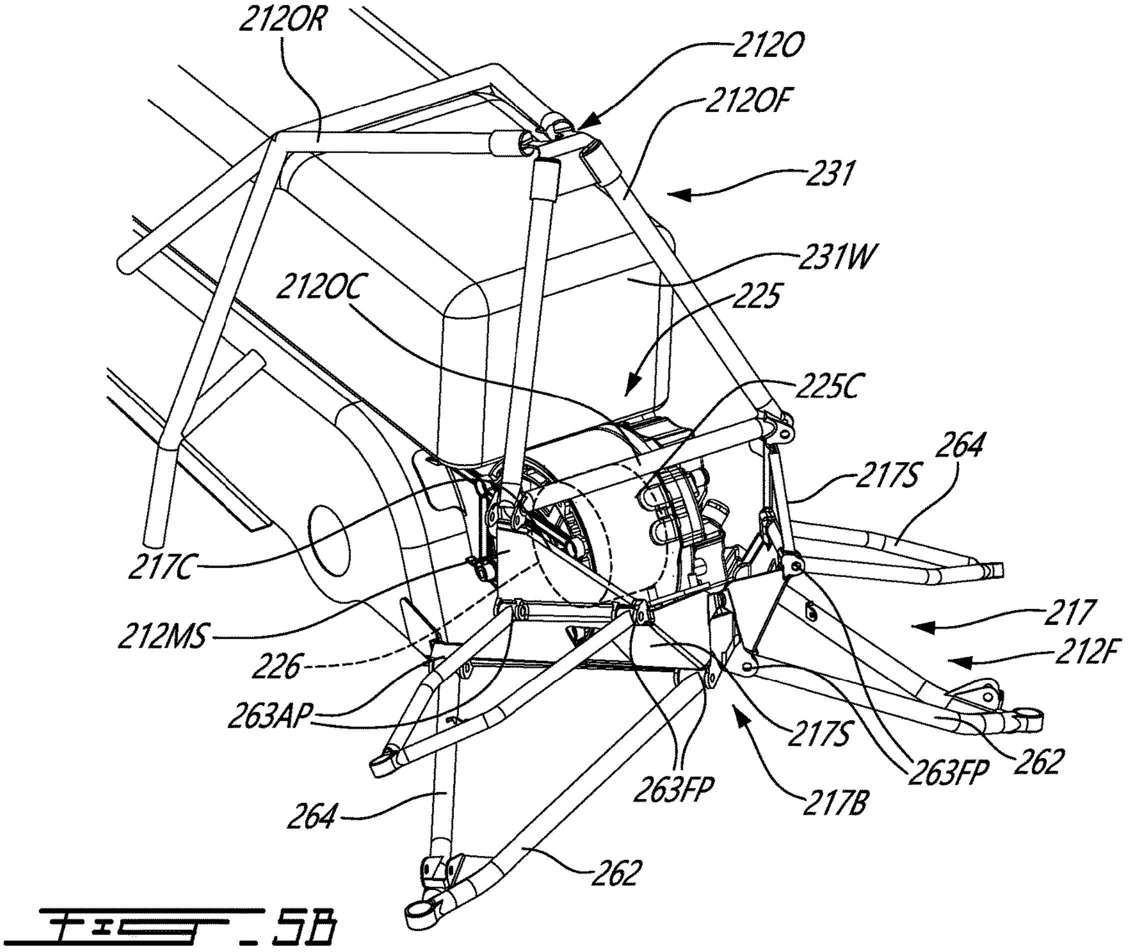
FIG. 5B is a schematic front perspective view of part of the snowmobile of FIG. 5A.

FIGS. 5A and 5B show a snowmobile 210, or parts thereof, in accordance with another embodiment. Snowmobile 210, as well as tunnel 214, body 212, skis 218, motor assembly 225, motor 226, battery modules 230, battery enclosure 231, front sub-frame 217, front suspension 260, lower suspension member 262, pickups 263, upper suspension member 264 and shock absorbers 266, may be similar to tunnel 14, 114, body 12, 112, skis 18, motor assembly 25, 125, motor 26, 126, battery modules 30, 130, battery enclosure 31, 131, front sub-frame 17,117, front suspension 160, lower suspension members 162, pickups 163, upper suspension members 64, 164 and shock absorbers 166 of snowmobile 10, 110.

Referring to FIGS. 5A and 5B, the front sub-frame 217 may be connected to and support the front suspension 260 of the snowmobile 210, such that the front sub-frame 217 may be structurally connected to the skis 218 via the front suspension 260 (e.g., via lower suspension members 262 defining lower wishbone structures and upper suspension members 264 defining upper wishbone structures). In some embodiments, the front sub-frame 217 may include a multi-sided (e.g., facetted) structure secured (e.g., fastened, welded) to the overstructure 212O and may define a load path between the skis 218 and the body 212 via the suspension 260 and the overstructure 212O. The running boards 14B are not shown in FIG. 5A so the ends of the transverse member 212OT of the overstructure 212O appear to be floating. However, the ends of the transverse member 212OT of the overstructure 212O may be connected (e.g., fastened) to body 212. The front sub-frame 217 may be laterally disposed between the two forward links 212OF of the overstructure 212O and secured to the forward links 212OF. The front sub-frame 217 may define an inner cavity 217C inside which some or all of the motor assembly 225 may be mounted via the motor support 212MS. For example, some of the motor assembly 225 may be received inside of the inner cavity 217C so that the front sub-frame 217 may serve as a cradle for the motor assembly 225. In some embodiments, the cross member 212OC may be disposed forwardly of the motor assembly 225. In alternative embodiments, the cross member 212OC may be disposed above or rearwardly of the motor assembly 225.

The base wall 217B and the side walls 217S may define the inner cavity 217C of the front sub-frame 217. The inner cavity 217C may be a volume partially enclosed by the front sub-frame 217 and in which part or all of the electric motor assembly 225, and possibly other components may be located. The inner cavity 217C may be delimited by the base wall 217B and by one or more side walls 217S. The inner cavity 217C may be at least partially delimited by additional components at the front end 212F of the body 212, such as cowling, casings, panels or the like. In some embodiments, the electric motor 226 of the electric motor assembly 225 may be positioned vertically higher than the lower suspension members 262 of the front suspension 260. This forward positioning of the electric motor assembly 225 may further contribute to providing a smaller (i.e. shorter) and thus lighter electric snowmobile 210, as described above.

The front sub-frame 217 may include a plurality of plates secured together to define the multi-sided structure. For example, the front sub-frame 217 may include the base wall 217B and the side walls 217S secured together. In some embodiments, the base wall 217B and the side walls 217S may include metallic (e.g., aluminum, steel) plates that are welded or fastened together. In some embodiments, the front sub-frame 217 may be machined from a blank of metallic material or cast. In some embodiments, the front sub-frame 217 may be molded using a fiber-reinforced composite material. In various embodiments, the front sub-frame 217 may be integrally formed (e.g., of unitary construction) or may include an assembly of parts. The motor support 212MS (e.g., bracket, mount, flange) may be used to secure the motor assembly 225 to the front sub-frame 217 and/or to other part of the body 212.

The base wall 217B may have a substantially horizontal orientation. The side walls 217S may extend upwardly from the base wall 217B. The front sub-frame 217 may be substantially laterally centered on the center plane CP. The base wall 217B and the side walls 217S may be positioned forwardly of the battery pack 231. The base wall 217B and the side walls 217S may be positioned forwardly of an upright and forwardmost wall 231W of the battery pack 231.

The front sub-frame 217 may define or provide vertically and/or horizontally spaced-apart attachment points (also referred to herein as "pickups") to which components of the front suspension 260 (e.g., lower suspension members 262 and upper suspension members 264) may be pivotably mounted. In some embodiments, the pickups may be pinned supports or connections permitting rotation of the lower suspension members 262 and upper suspension members 264 relative to the front sub-frame 217.

FIGS. 6A through 6E show a snowmobile 310 in accordance with another embodiment. Snowmobile 310, as well as tunnel 314, drive track 315, body 312, motor assembly 325, motor 326, battery modules 330, front sub-frame 317, front suspension 360, lower suspension member 362, pickups 363, upper suspension member 364 and shock absorbers 366, may be similar to tunnel 14, 114, 214, drive track 15, 115, body 12, 112, 214, skis 18, 218, motor assembly 25, 125, 225, motor 26, 126, 226, battery modules 30, 130, 230, battery enclosure 31, 131, 231, front sub-frame 17,117, 217, front suspension 160, 260, lower suspension members 162, 262, pickups 163, 263, upper suspension members 164, 264, and shock absorbers 166, 266 of snowmobile 10, 110, 210.

The front suspension 360 is now described in greater detail with reference to FIGS. 6A and 6B. The front suspension 360 may include multiple lower suspension members 362, and multiple upper suspension members 364, interconnecting the body 312 and the skis 318. For example, the suspension members 362, 364 may be pivotally connected to the front sub-frame 317 at the pickups 363AP, 363FP (shown in FIG. 6A), and also be pivotally connected to the skis 318 at the spindles 271 (shown in FIG. 5A). The upper suspension members 364 may be positioned vertically higher than the lower suspension members 362. In some embodiment, the pickups 363AP, 363FP associated with the upper suspension members 364 and the front sub-frame 317 may be positioned vertically higher than the pickups 363AP, 363FP associated with the lower suspension members 362 and the front sub-frame 317. For example, the pickups 363AP, 363FP associated with the upper suspension members 364 and the front sub-frame 317 may have a greater height measured from a common datum like the ground than the pickups 363AP, 363FP associated with the lower suspension members 362 and the front sub-frame 317. In some embodiments, there may be some vertical overlap between components of upper suspension members 364 and of the lower suspension members 362.

The front suspension 360 may also include other components in addition to the lower and upper suspension members 362, 364. For example, and referring to FIGS. 5A and 6E, the front suspension 260, 360 may also include shock absorbers 266, 366. Each shock absorber 266, 366 may extend from an upper end pivotably mounted to the front sub-frame 317, and a lower end pivotably mounted to a component of one of the skis 218 (see FIG. 5A), such as the spindles 271. The front suspension 360 may include more components, in addition to or in replacement of those described herein. Some non-limiting examples of other components include tie rods, arms, links, springs, and pivots.

The front suspension 360 may have lateral symmetry. More particularly, and referring to FIG. 6A, the features of the lower and upper suspension members 362, 364 may be disposed on opposite sides of the center plane CP and may be substantially symmetrical about the center plane CP. Referring to FIG. 6A, the lower suspension members 362 may include two lower suspension members 362, each of which being disposed on opposite sides of the center plane CP, and each of which being spaced a same lateral distance from the center plane CP. Similarly, and referring to FIG. 6A, the upper suspension members 364 may include two upper suspension members 364, each of which being disposed on opposite sides of the center plane CP, and each of which being spaced a same lateral distance from the center plane CP. Each pair of lower suspension members 362 and each pair of upper suspension members 364 may be symmetric about the center plane CP. In some embodiments, the lower suspension member 362 and the upper suspension member 364 on each side of the center plane CP may be collectively referred to as the "right" or the "left" portion of the front suspension 360.

Figure 6A:
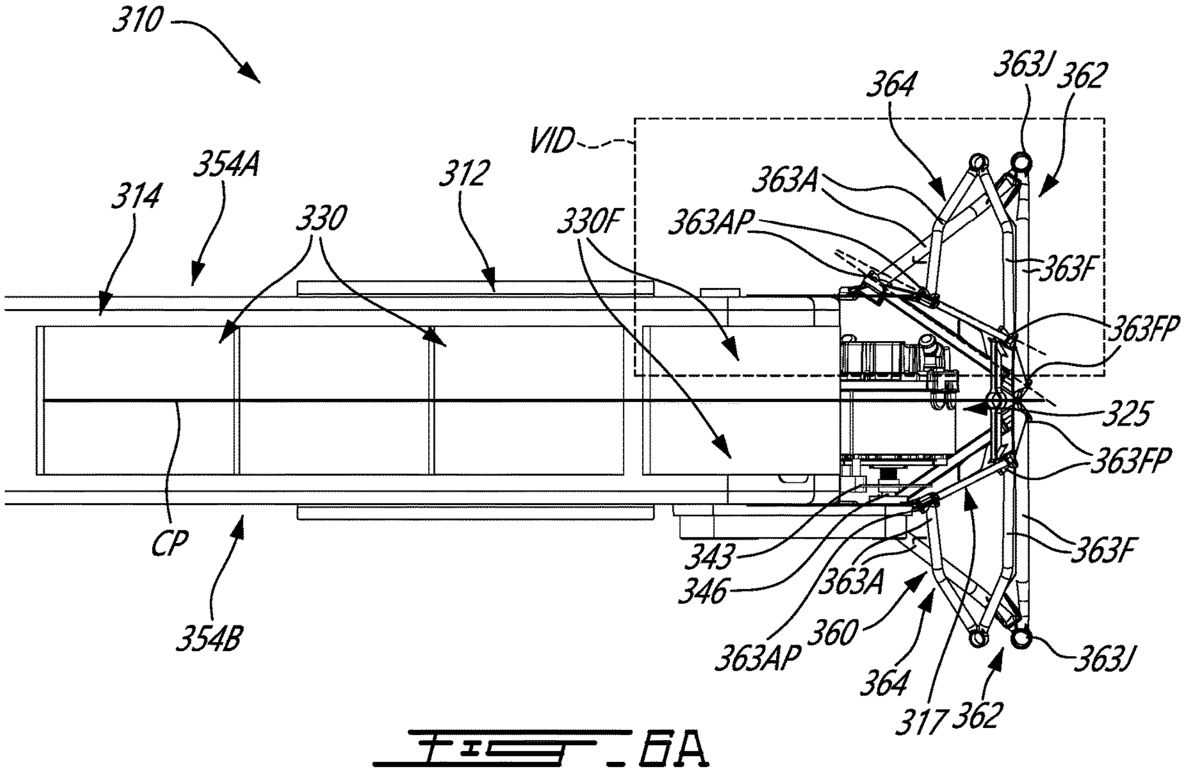
FIG. 6A is a schematic top view of part of a snowmobile according to an embodiment.
Figure 6B:
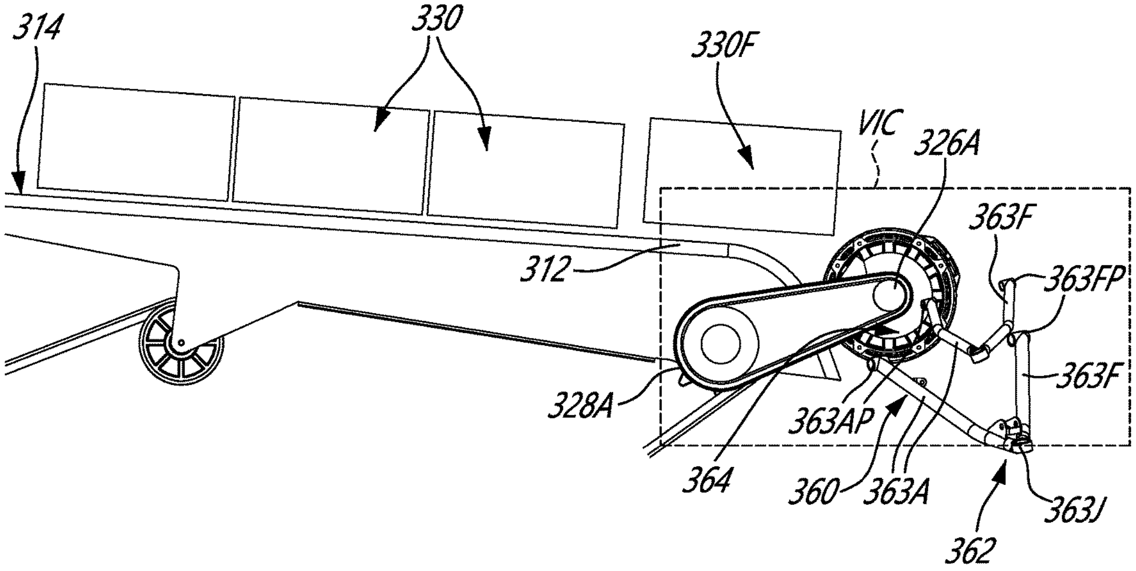
FIG. 6B is a schematic side elevational view of part of the snowmobile of FIG. 6A.

Referring to FIGS. 6A and 6B, each of the lower suspension members 362 and each of the upper suspension members 364 may be a multiple-member linkage. Each suspension member 362, 364 may include two links (e.g., an aft link 363A and a forward link 363F) joined together at a joint 363J. Each aft link 363A may include or define an aft pickup 363AP or attachment point of the suspension member 362, 364 to the front sub-frame 317. The aft pickups 363AP of the suspension members 362, 364 may be disposed symmetrically about the center plane CP. Similarly, each forward link 363F may include or define a forward pickup 363FP or attachment point of the suspension member 362, 364 to the front sub-frame 317. The forward pickups 363FP of the suspension members 362, 364 may be disposed symmetrically about the center plane CP. The forward pickup 363FP of any one of the suspension members 362, 364 may be positioned forwardly of the aft pickup 363AP of that suspension member 362, 364. In some embodiments, each suspension member 362, 364 may have a "wishbone" or "A-frame" architecture, and may therefore also be referred herein to as a wishbone suspension member 362, 364. Thus, in the configuration of the front suspension 360 shown in FIGS. 6A and 6B, each of the left-hand and right-hand sides of the snowmobile 310 has two wishbone suspension members (upper and lower suspension members 362, 364) and a shock absorber 366. The joints 363J of all of the lower and upper suspension members 362, 364 may be pivotably mounted to components (e.g. spindles 271 shown in FIG. 5A) of the skis 218, for example.

The aft pickups 363AP associated with each lower and upper suspension member 362, 364 may pivotably connect the aft links 363A to the front sub-frame 317. Similarly, the forward pickups 363FP associated with each lower and upper suspension member 362, 364 may pivotably connect the forward links 363F to the front sub-frame 317.

In some embodiments, at least some of the front suspension 360 is mounted rearward of the electric motor assembly 325. For example, and referring to FIGS. 6C and 6D, the aft pickups 363AP of the lower suspension members 362 may be positioned longitudinally rearward of at least a portion of the electric motor assembly 325. The aft pickups 363AP of the lower suspension members 362 on both sides of the center plane CP may be positioned longitudinally rearward of the motor output 326A of the electric motor 326. The aft pickups 363AP of the lower suspension members 362 may be positioned longitudinally rearward than at least a portion of the motor casing 325C. The forward pickups 363FP of the lower suspension members 362, on both sides of the center plane CP, may be positioned longitudinally rearward of at least a portion of the motor casing 325C. The aft pickups 363AP of the upper suspension members 364 on both sides of the center plane CP may be positioned longitudinally rearward of at least a portion of the electric motor assembly 325. The aft pickups 363AP of the upper suspension members 364 may be positioned longitudinally rearward of the motor casing 325C. The aft pickups 363AP of the upper suspension members 364 on both sides of the center plane CP may be positioned longitudinally rearward of the motor output 326A. The aft pickups 363AP of the upper suspension members 364 may be positioned longitudinally within the diameter of the motor casing 325C in the configuration shown where the motor casing 325C includes a cylindrical body.

Figure 6C:
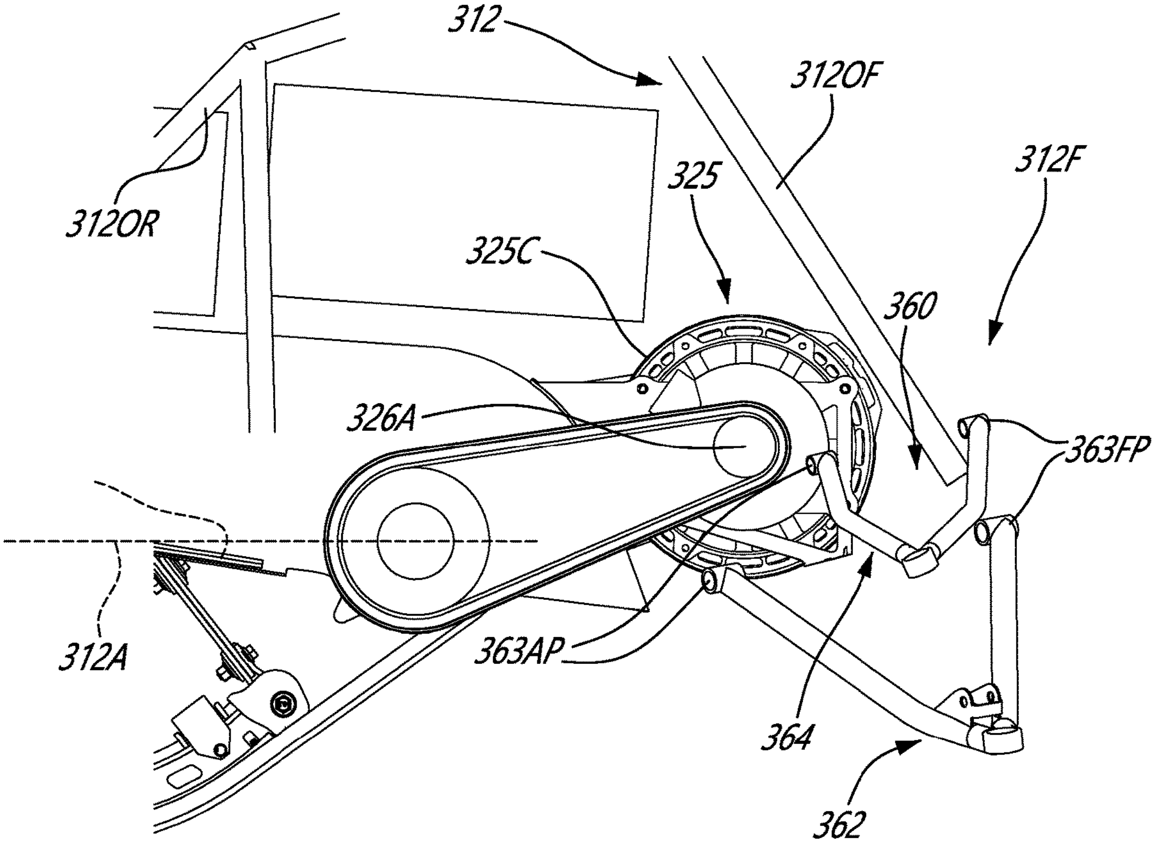
FIG. 6C is an enlarged view of the region VIC of FIG. 6B.

In some embodiments, at least some of the front suspension 360 is mounted toward the bottom of the snowmobile 310. For example, and referring to FIG. 6C, the aft pickups 363AP of the lower suspension members 362 may be positioned vertically aligned with, or lower than, the electric motor assembly 325. Referring to FIG. 6C, the aft pickups 363AP of the lower suspension members 362 may have a height measured from the ground that is equivalent to or less than the height of the electric motor assembly 325 measured from the ground. The aft pickups 363AP of the lower suspension members 362 on both sides of the center plane CP may be positioned lower than the motor output 326A of the electric motor 326. The aft pickups 363AP of the lower suspension members 362 may be positioned vertically aligned with, or lower than, the motor casing 325C. The forward pickups 363FP of the lower suspension members 362, on both sides of the center plane CP, may be positioned beneath the motor output 326A. The aft pickups 363AP of the upper suspension members 364 may be positioned lower than the motor output 326A, on both sides of the center plane CP. The aft pickups 363AP of the upper suspension members 364 may be positioned vertically within the diameter of the motor casing 325C in the configuration shown where the motor casing 325C includes a cylindrical body. It will thus be appreciated that the aft pickups 363AP of both the lower and upper suspension members 362, 364 may be mounted to the body 312 in proximity to the electric motor assembly 325.

The front suspension 360 may be mounted at the front end 312F of the body 312 of the snowmobile 310. For example, and referring to FIG. 6C, the forward pickups 363FP of the of upper suspension members 364 may be positioned forwardly of the electric motor assembly 325. The forward pickups 363FP of the of upper suspension members 364 may be positioned forwardly of the motor casing 325C. The forward pickups 363FP of the lower suspension members 362 may be positioned forwardly of the electric motor assembly 325. The forward pickups 363FP of the lower suspension members 362 may be positioned forwardly of the motor casing 325C. In the configuration of the front suspension 360 of FIG. 6C, the aft pickups 363AP of both the lower and upper suspension members 362, 364 may be longitudinally aligned with the motor casing 325C. Referring to FIG. 6C, the aft pickups 363AP of both the lower and upper suspension members 362, 364 may have a position along the longitudinal axis 312A that is within the axial extent occupied by the diameter of the motor casing 325C in the configuration shown where the motor casing 325C includes a cylindrical body. In some embodiments, almost the entirety of the front suspension 360 may be located forward of the electric motor assembly 325. Both the lower and upper suspension members 362, 364, on both sides of the center plane CP, may be positioned forwardly of the battery pack 331 (see FIG. 6D). Both the lower and upper suspension members 362, 364, on both sides of the center plane CP, may be positioned forwardly of the upright forwardmost wall 331W of the battery pack 331.

In some embodiments, at least some of the front suspension 360 may be mounted laterally outwardly from the center plane CP. For example, and referring to FIG. 6D, the aft pickups 363AP and the forward pickups 363FP of the lower suspension members 362 may be spaced laterally from the center plane CP. The aft pickup 363AP and the forward pickup 363FP of the lower suspension member 362 on one lateral side of the center plane CP may be spaced the same lateral distance from the center plane CP as the corresponding aft pickup 363AP and forward pickup 363FP of the lower suspension member 362 on the other lateral side of the center plane CP. Similarly, the aft pickup 363AP and the forward pickup 363FP of the upper suspension member 364 on one lateral side of the center plane CP may be spaced the same lateral distance from the center plane CP as the corresponding aft pickup 363AP and forward pickup 63FP of the upper suspension member 364 on the other lateral side of the center plane CP. The aft pickups 363AP of the lower suspension members 362 may be spaced laterally further from the center plane CP than the forward pickups 363FP of the lower suspension members 362. Similarly, the aft pickups 363AP of the upper suspension members 364 may be spaced laterally further from the center plane CP than the forward pickups 363FP of the upper suspension members 64. The forward pickups 63FP of the upper suspension members 364 may be spaced laterally further from the center plane CP than the forward pickups 363FP of the lower suspension members 362. The aft pickups 363AP of the upper suspension members 364 may be spaced laterally further from the center plane CP than the aft pickups 363AP of the lower suspension members 362. The positioning of the aft pickups 363AP and/or the forward pickups 363FP laterally away from the center plane CP may help create space at the front end 312F of the body 321 for the motor casing 325C and the motor 326 to be received in the inner cavity 317C of the front sub-frame 317. The positioning of the aft pickups 363AP and/or the forward pickups 363FP laterally away from the center plane CP may allow for positioning the electric motor assembly 325 along the longitudinal axis 312A or along the center plane CP, and for positioning the electric motor assembly 325 as forwardly along the snowmobile 310 as possible.

Figure 6D:
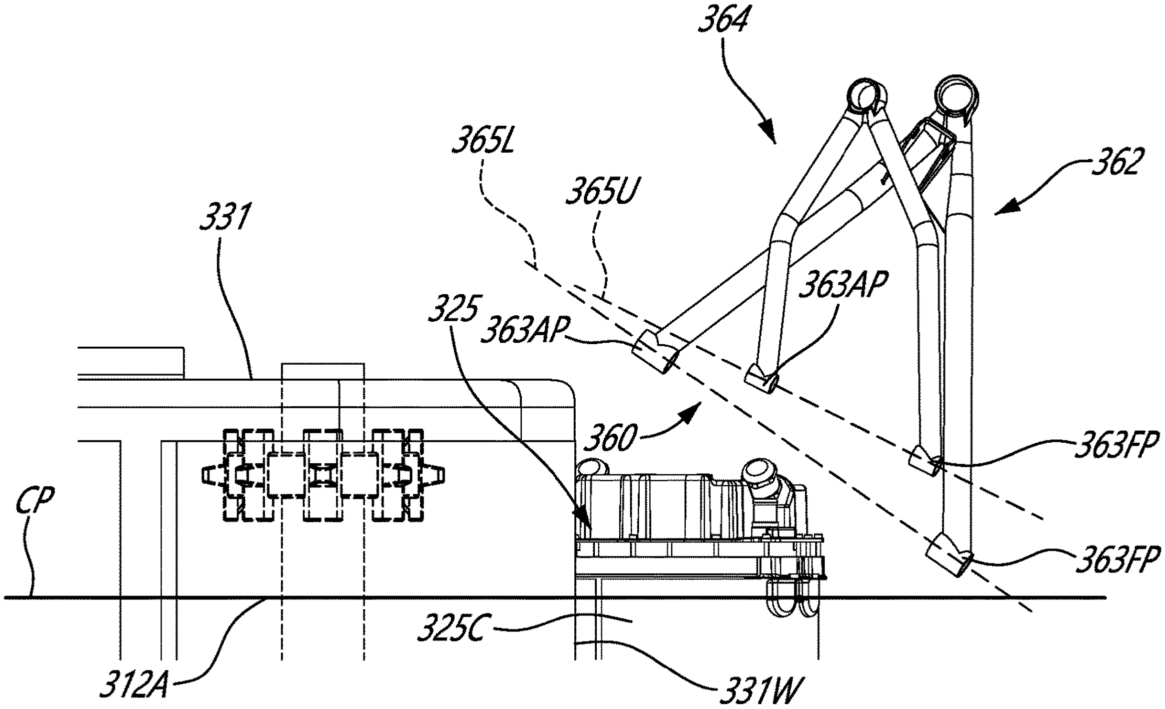
FIG. 6D is an enlarged view of the region VID of FIG. 6A.
Figure 6E:
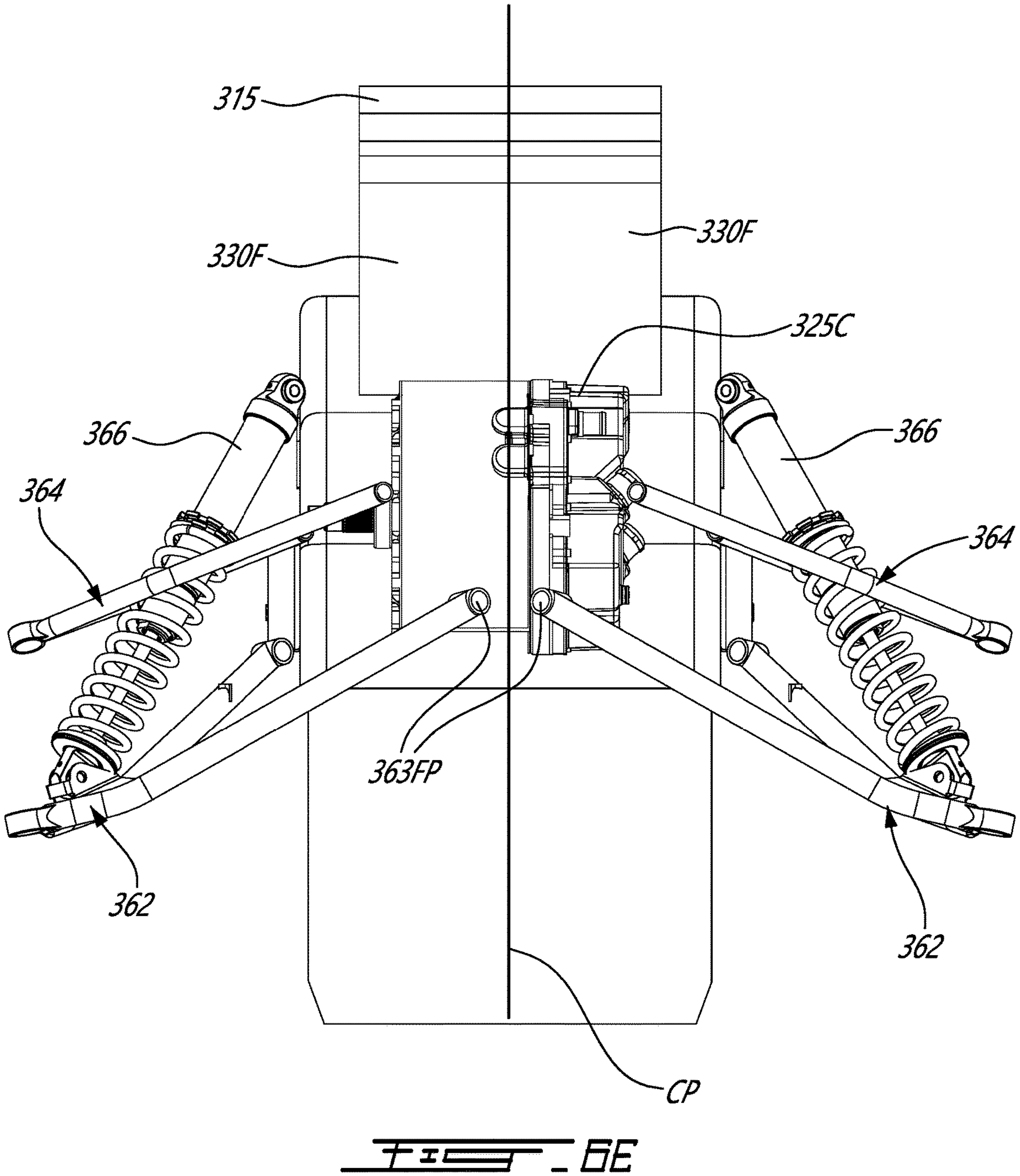
FIG. 6E is another schematic bottom view of part of the snowmobile of FIG. 6A.

Referring to FIG. 6D, an upper pivot axis 365U of the front suspension 360 may extend between and through the aft pickup 363AP and the forward pickup 363FP of each upper suspension member 364. Similarly, a lower pivot axis 365L may extend between and through the aft pickup 363AP and the forward pickup 363FP of each lower suspension member 362. The upper and lower pivot axes 365U, 365L may be the axes about which the upper suspension members 364 and the lower suspension members 362, respectively, pivot relative to the body 312. Thus the combination of the aft pickup 363AP and the forward pickup 363FP for each wishbone suspension member 362, 364 creates the wishbone's pivot axis 365U, 365L. On each side of the center plane CP, the upper pivot axis 365U may be positioned higher than the lower pivot axis 365L. When projected onto a horizontal plane, such as the plane of the page containing FIG. 6D, the upper pivot axis 365U may be transverse or not parallel to the lower pivot axis 365L in the horizontal plane. This may be the case on each side of the center plane CP. Thus, in a top-down view such as shown in FIG. 6D, the upper pivot axis 365U and the lower pivot axis 365L may be non-parallel, on both sides of the center plane CP. The positioning of the aft pickups 363AP laterally outwardly from the center plane CP to make space for the electric motor assembly 325 at the front end 312F of the body 312 may cause the upper and lower pivot axes 365U, 365L to be transverse. The non-parallel upper and lower pivot axes 365U, 365L may also help to form a more desirable load path from the front suspension 360 to the body 312. The non-parallel upper and lower pivot axes 365U, 365L may allow for more desirable or aggressive styling of the "pointed" front portion of the snowmobile 310.

Referring to FIG. 6D, the upper pivot axis 365U and the lower pivot axis 365L may be transverse to the longitudinal axis 12A, which lies in center plane CP. The pivot axis 365U, 365L of each wishbone suspension member 362, 364 may be oriented at a non-zero angle in relation to the longitudinal axis 312A, or in relation to the forward direction of travel of the snowmobile 310, or in relation to the center plane CP. The upper and lower pivot axes 365U, 365L may be transverse to the center plane CP. The upper pivot axes 365U of the upper suspension members 364 positioned on opposite sides of the center plane CP may be transverse to one another. When projected onto a horizontal plane, the upper pivot axes 365U of the upper suspension members 364 positioned on opposite sides of the center plane CP may converge toward each other and toward the center plane CP in a forward direction of travel, so as to intersect the center plane CP at a non-right angle. Similarly, the lower pivot axes 365L of the lower suspension members 362 positioned on opposite sides of the center plane CP may be transverse to one another. When projected onto a horizontal plane, the lower pivot axes 365L of the lower suspension members 362 positioned on opposite sides of the center plane CP may converge toward each other and toward the center plane CP in a forward direction of travel, so as to intersect the center plane CP at a non-right angle.

When projected onto a horizontal plane, the upper pivot axes 365U of the upper suspension members 364 may be oriented at a first acute angle to the longitudinal axis 312A. When projected onto a horizontal plane, the lower pivot axes 365L of the lower suspension members 362 may be oriented at a second acute angle to the longitudinal axis 312A. In some embodiments, the first acute angle associated with the upper pivot axes 365U may be smaller than the second acute angle associated with the lower pivot axes 365L. In some embodiments, the upper pivot axis 365U and the lower pivot axis 365L of one side of the suspension (such as the left or right side) may converge toward each other away from the center plane and rearwardly of the motor assembly 325.

In some embodiment not shown in the figures, the forward pickups 363FP of the lower suspension members 362 may be positioned beneath the motor casing 325C. In some embodiments, the battery enclosure 231 (shown in FIG. 5) housing the forwardmost battery modules 330F may be symmetrically disposed about the center plane CP. Each forwardmost battery module 330F of the two forwardmost battery modules 330F may be disposed on opposite sides of the center plane CP. Each forwardmost battery module 330F may be spaced laterally equidistantly from the center plane CP. This positioning of one forwardmost battery module 30F on opposite sides of the center plane CP may create a space between the forward battery modules 330F for passage therethrough of a component of the snowmobile 10, such as the steering column 119 (see FIG. 3C).

The figures provided herein show schematic representations of the snowmobile components in relation to one another to facilitate understanding of the relative positioning of the components as described and claimed.

The embodiments described in this document provide non-limiting examples and embodiments of possible implementations of the present technology. Upon review of the present disclosure, a person of ordinary skill in the art will recognize that changes may be made to the embodiments described herein without departing from the scope of the present technology. For example, although the configurations and the relative position of the electric motor assembly 25, 125, 225, 325, the battery pack 31, 131, 231, the battery modules 30, 130, 230, 330 and the front suspension 60, 160, 260, 360 may be described separately or in isolation, it will be appreciated that the description of the configuration and of the relative position of these features may be combined in any desirable combination. Yet further modifications could be implemented by a person of ordinary skill in the art in view of the present disclosure, which modifications would be within the scope of the present technology.

The invention claimed is:

1. A snowmobile comprising:

a body extending along a longitudinal axis between a front end and a rear end;

a battery pack mounted to the body and enclosing a plurality of battery modules;

an electric motor assembly mounted to the body, the electric motor assembly including an electric motor configured to receive electrical energy from the plurality of battery modules to drive a motor output of the electric motor; and a transmission comprising:

a transmission shaft extending along a transmission shaft axis between a first end drivingly coupled to the motor output and a second end; and a drive wheel drivingly coupled to the second end of the transmission shaft, wherein an output speed at the second end of the transmission shaft axis differs from an input speed at the first end of the transmission shaft axis.

2. The snowmobile of claim 1, wherein the body defines a center plane being upright and containing the longitudinal axis, the transmission shaft axis being transverse to the center plane.

3. The snowmobile of claim 2, wherein the motor output, the transmission shaft and the drive wheel are disposed on only one side of the center plane.

4. The snowmobile of claim 3, wherein the drive wheel transmits torque to a drive belt, the drive belt in communication with a drive track wheel.

5. The snowmobile of claim 1, wherein the transmission shaft is supported at the first end by a first bearing and at the second end by a second bearing.

6. The snowmobile of claim 5, wherein the electric motor assembly includes a motor casing enclosing the electric motor, the motor casing being mounted to the body, wherein one of the body and the motor casing includes the first bearing.

7. The snowmobile of claim 5, wherein the body includes a drive belt case, the drive belt case including the second bearing.

8. The snowmobile of claim 7, wherein the drive belt case at least partially encloses the drive wheel and a drive track wheel.

9. The snowmobile of claim 5, wherein the transmission shaft is hard-mounted to the body via the first and second bearings, and the electric motor is soft-mounted to the body via one or more dampers.

10. The snowmobile of claim 1, comprising at least one brake actionable against the transmission shaft at a location between the first end and the second end.

11. The snowmobile of claim 1, wherein the motor output includes a female spline and the first end of the transmission shaft includes a male spline.

12. The snowmobile of claim 1, wherein the transmission shaft axis is collinear with a motor output axis.

13. An electric vehicle comprising:

a body extending along a longitudinal axis between a front end and a rear end;

a battery pack mounted to the body and enclosing a plurality of battery modules;

an electric motor assembly mounted to the body, the electric motor assembly including an electric motor configured to receive electrical energy from the plurality of battery modules to drive a motor output of the electric motor, the electric motor being soft-mounted to the body; and a transmission comprising a transmission shaft extending along a transmission shaft axis between a first end drivingly coupled to the motor output and a second end, wherein:

the transmission shaft axis is co-axial with a motor output axis; and an output speed at the second end of the transmission shaft axis differs from an input speed at the first end of the transmission shaft axis.

14. The electric vehicle of claim 13, wherein the motor output includes a female spline and the first end of the transmission shaft includes a male spline.

15. The electric vehicle of claim 13, wherein the body defines a center plane being upright and containing the longitudinal axis, the transmission shaft axis being transverse to the center plane.

16. The electric vehicle of claim 13, wherein the transmission shaft is supported at the first end by a first bearing and at the second end by a second bearing.

17. The electric vehicle of claim 16, wherein the electric motor assembly includes a motor casing enclosing the electric motor, the motor casing being mounted to the body, wherein one of the body and the motor casing includes the first bearing.

18. The electric vehicle of claim 16, wherein the body includes a drive belt case, the drive belt case including the second bearing.

19. A snowmobile comprising:

a body extending along a longitudinal axis between a front end and a rear end;

a battery pack mounted to the body and enclosing a plurality of battery modules;

an electric motor assembly mounted to the body, the electric motor assembly including an electric motor configured to receive electrical energy from the plurality of battery modules to drive a motor output of the electric motor; and a transmission comprising:

a transmission shaft extending along a transmission shaft axis between a first end drivingly coupled to the motor output and a second end; and a drive wheel drivingly coupled to the second end of the transmission shaft, wherein:

the body defines a center plane being upright and containing the longitudinal axis, the transmission shaft axis being transverse to the center plane; and the motor output, the transmission shaft and the drive wheel are disposed on only one side of the center plane.

* * * * *